United States Patent
Muraishi

(10) Patent No.: US 11,003,114 B2
(45) Date of Patent: May 11, 2021

(54) IMAGE PROCESSING APPARATUS THAT CONTROLS FIXING TEMPERATURE BASED ON THE SIMILARITY OF IMAGE DATA OF THE CURRENT PAGE AND THE NEXT PAGE, IMAGE PROCESSING METHOD, AND RECORDING MEDIUM

(71) Applicant: CANON KABUSHIKI KAISHA, Tokyo (JP)

(72) Inventor: Masaaki Muraishi, Abiko (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/744,001

(22) Filed: Jan. 15, 2020

(65) Prior Publication Data
US 2020/0233345 A1    Jul. 23, 2020

(30) Foreign Application Priority Data
Jan. 21, 2019  (JP) .............................. JP2019-007941

(51) Int. Cl.
| G03G 15/20 | (2006.01) |
| G03G 15/00 | (2006.01) |
| G06T 7/90 | (2017.01) |
| H04N 1/405 | (2006.01) |
| G06T 7/11 | (2017.01) |

(52) U.S. Cl.
CPC ..... *G03G 15/2039* (2013.01); *G03G 15/5062* (2013.01); *G03G 15/556* (2013.01); *G06T 7/11* (2017.01); *G06T 7/90* (2017.01); *H04N 1/405* (2013.01); *G03G 2215/00067* (2013.01)

(58) Field of Classification Search
USPC .......................................... 399/69
See application file for complete search history.

(56) References Cited

U.S. PATENT DOCUMENTS

| 2014/0369707 A1* | 12/2014 | Imine ................. G03G 15/2039 399/69 |
| 2015/0071669 A1* | 3/2015 | Goda ..................... G03G 15/01 399/69 |
| 2015/0086230 A1* | 3/2015 | Fujimori ............ G03G 15/2039 399/69 |
| 2015/0139676 A1* | 5/2015 | Yamamoto ......... G03G 15/2039 399/69 |
| 2015/0362870 A1* | 12/2015 | Ogushi .................. G03G 15/23 399/66 |
| 2019/0179238 A1* | 6/2019 | Suzuki ............... G03G 15/5045 |

FOREIGN PATENT DOCUMENTS

| JP | 2014-074894 A | 4/2014 |
| JP | 2017-201385 A | 11/2017 |

* cited by examiner

*Primary Examiner* — Q Grainger
(74) *Attorney, Agent, or Firm* — Canon U.S.A., Inc. I.P. Division

(57) ABSTRACT

In a case where an analysis result of image data of an (N+1)th page has not been acquired among image data, a fixing temperature for printing image data of an N-th page is determined at least based on a result of determination as to whether the image data of the N-th page and the image data of the (N+1)th page are similar and an analysis result of the image data of the N-th page.

8 Claims, 16 Drawing Sheets

FIG.10A

| N-1 | N | N+1 | TARGET FIXING TEMPERATURE |
|---|---|---|---|
| FIXING TEMPERATURE OF (N-1)TH PAGE | IMAGE ANALYSIS RESULT | | WHEN IMAGE ANALYSIS RESULT OF (N+1)TH PAGE IS UNKNOWN |
| 200°C | LOW | (UNKNOWN) | 205°C |
| 200°C | LOW | (UNKNOWN) | 205°C |
| 200°C | HIGH | (UNKNOWN) | 210°C |
| 200°C | HIGH | (UNKNOWN) | 210°C |
| 205°C | LOW | (UNKNOWN) | 205°C |
| 205°C | LOW | (UNKNOWN) | 205°C |
| 205°C | HIGH | (UNKNOWN) | 210°C |
| 205°C | HIGH | (UNKNOWN) | 210°C |
| 210°C | LOW | (UNKNOWN) | 205°C |
| 210°C | LOW | (UNKNOWN) | 205°C |
| 210°C | HIGH | (UNKNOWN) | 210°C |
| 210°C | HIGH | (UNKNOWN) | 210°C |

FIG.10B

| N-1 | N | N+1 | TARGET FIXING TEMPERATURE |
|---|---|---|---|
| FIXING TEMPERATURE OF (N-1)TH PAGE | IMAGE ANALYSIS RESULT | | PRESENT METHOD |
| 200°C | LOW | LOW | 200°C |
| 200°C | LOW | HIGH | 205°C |
| 200°C | HIGH | LOW | 210°C |
| 200°C | HIGH | HIGH | 210°C |
| 205°C | LOW | LOW | 200°C |
| 205°C | LOW | HIGH | 205°C |
| 205°C | HIGH | LOW | 210°C |
| 205°C | HIGH | HIGH | 210°C |
| 210°C | LOW | LOW | 205°C |
| 210°C | LOW | HIGH | 205°C |
| 210°C | HIGH | LOW | 210°C |
| 210°C | HIGH | HIGH | 210°C |

FIG.10C

| N-1 | N | N+1 | TARGET FIXING TEMPERATURE |
|---|---|---|---|
| FIXING TEMPERATURE OF (N-1)TH PAGE | IMAGE ANALYSIS RESULT | | PRESENT METHOD |
| 200°C | LOW | SIMILAR | 200°C |
| 200°C | LOW | DISSIMILAR | 205°C |
| 200°C | HIGH | DISSIMILAR | 210°C |
| 200°C | HIGH | SIMILAR | 210°C |
| 205°C | LOW | SIMILAR | 200°C |
| 205°C | LOW | DISSIMILAR | 205°C |
| 205°C | HIGH | DISSIMILAR | 210°C |
| 205°C | HIGH | SIMILAR | 210°C |
| 210°C | LOW | SIMILAR | 205°C |
| 210°C | LOW | DISSIMILAR | 205°C |
| 210°C | HIGH | DISSIMILAR | 210°C |
| 210°C | HIGH | SIMILAR | 210°C |

| VIDEO COUNT | C:222000<br>M:111000<br>Y:55000<br>K:340000 | C:222000<br>M:111000<br>Y:55000<br>K:341000 |
|---|---|---|
| IMAGE ANALYSIS RESULT | LOW APPLIED AMOUNT | LOW APPLIED AMOUNT |
| RESULT OF COMPARISON BETWEEN N-TH PAGE AND (N+1)TH PAGE | SIMILAR IMAGES ||

| VIDEO COUNT | C:222000<br>M:111000<br>Y:55000<br>K:340000 | C:232000<br>M:121000<br>Y:57800<br>K:341000 |
|---|---|---|
| IMAGE ANALYSIS RESULT | LOW APPLIED AMOUNT | HIGH APPLIED AMOUNT |
| RESULT OF COMPARISON BETWEEN N-TH PAGE AND (N+1)TH PAGE | DISSIMILAR IMAGES ||

FIG. 14A
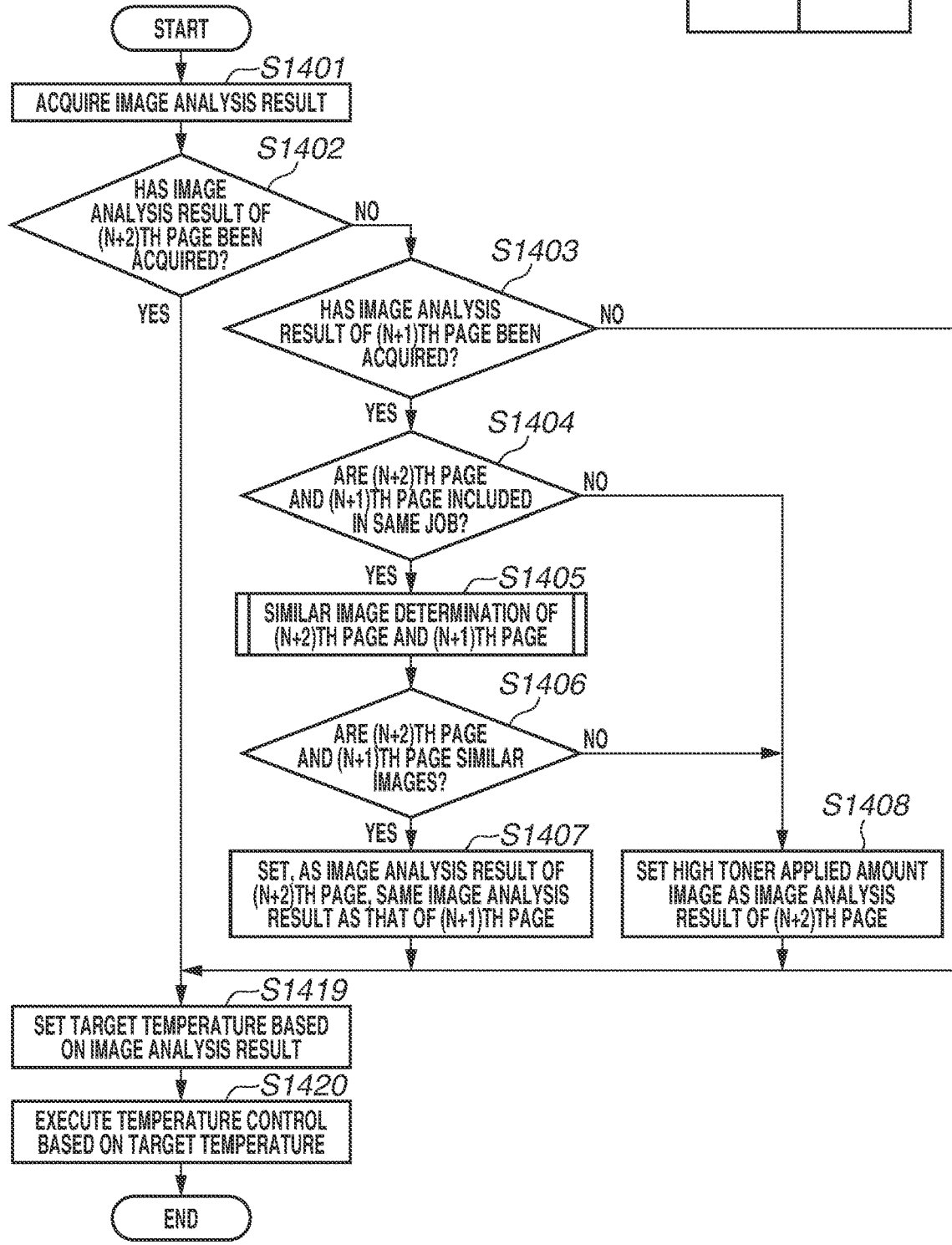

IMAGE PROCESSING APPARATUS THAT CONTROLS FIXING TEMPERATURE BASED ON THE SIMILARITY OF IMAGE DATA OF THE CURRENT PAGE AND THE NEXT PAGE, IMAGE PROCESSING METHOD, AND RECORDING MEDIUM

BACKGROUND

Field of the Disclosure

The present disclosure relates to an image processing apparatus and an image processing method that control a fixing temperature for heat-fixing a toner image formed by an electrophotographic method, onto a recording sheet, and a program for executing image processing.

Description of the Related Art

Conventionally, in the electrophotographic method, in fixing a formed toner image onto a recording sheet, toner is melted by adding heat to the toner image and the toner image is fixed onto the recording sheet by applying pressure to the toner image. At this time, in accordance with an amount of color material to be applied onto a recording sheet per unit area, a fixing temperature at which an image can be surely fixed is determined as a fixing temperature of a fixing unit.

In the case of outputting a black character image, since printing is performed using only a black color material, a temperature required for fixing is lower as compared with the case of forming an image by overlapping a plurality of color materials such as cyan, magenta, yellow, and black (CMYK). If a fixing temperature can be controlled to a low temperature, power consumption can be reduced. Thus, there have been proposed various methods of analyzing image data and controlling a fixing temperature in accordance with the image data.

For example, Japanese Patent Application Laid-Open No. 2014-074894 discusses a method of controlling a fixing temperature in accordance with an image area of a portion in which toner with a predetermined amount or more is applied.

In addition, Japanese Patent Application Laid-Open No. 2017-201385 discusses a method of determining a region having a predetermined toner applied amount, and controlling a fixing temperature in accordance with an environmental state detected by an environmental sensor.

In the case of determining fixing temperatures of a plurality of pages, for determining a fixing temperature of an N-th page, it is necessary to consider a toner applied amount of an (N+1)th page. A control example of setting a fixing temperature to either of the two levels including "high" and "low" will be described. For example, even in a case where a fixing temperature can be set to "low" when an amount of color material to be used for forming an image on an N-th page is small and only the N-th page is printed, it is necessary to set a fixing temperature of the N-th page to "high" if an amount of color material to be used for forming an image on an (N+1)th page is large. This is because the temperature of a heater cannot be rapidly increased and it is accordingly necessary to increase the temperature of the heater to "high" from the fixing timing of the N-th page in such a manner that a fixing temperature of the (N+1)th page can be set to "high".

Thus, if an image analysis result of the (N+1)th page cannot be acquired when a fixing temperature of the N-th page is determined, for preventing a fixing temperature of the (N+1)th page from failing to increase to a required temperature, the following processing is considered to be performed. More specifically, a fixing temperature of the N-th page is controlled on the assumption that the (N+1)th page is to be fixed at a sufficiently high temperature. For example, if an image analysis result of the (N+1)th page cannot be acquired, a fixing temperature of the N-th page is determined on the assumption that the (N+1)th page is to be fixed at "high" temperature.

In such a case, even if color material amounts of both the N-th page and the (N+1)th page are actually small and fixing temperatures can be set to "low", a fixing temperature of the N-th page is sometimes set to "high" in preparation for printing the (N+1)th page at "high" temperature. Accordingly, power saving cannot be achieved in some cases.

SUMMARY OF THE INVENTION

The following exemplary embodiments enable power saving by appropriately controlling a fixing temperature of a page of which a fixing temperature is to be determined, even in a case where an image analysis result of a page subsequent to the page of which a fixing temperature is to be determined cannot be acquired.

According to an aspect of the present disclosure, an image processing apparatus that controls a fixing temperature for fixing developer onto a recording medium, includes at least one controller, having at least one processor which executes instructions stored in at least one memory and/or at least one circuitry, being configured to perform analysis of image data, determine whether images on a plurality of pages included in the image data are similar images based on information acquirable before the analysis, and control a fixing temperature for printing the image data, based on an analysis result of the analysis, wherein the at least one controller is configured to, in a case where an analysis result of image data of an (N+1)th page has been acquired among the image data, determine a fixing temperature for printing image data of an N-th page, at least based on an analysis result of the image data of the N-th page and the analysis result of the image data of the (N+1)th page among the image data, and, in a case where the analysis result of the image data of the (N+1)th page has not been acquired, determine a fixing temperature for printing the image data of the N-th page, at least based on a result of determination as to whether the image data of the N-th page and the image data of the (N+1)th page are similar and the analysis result of the image data of the N-th page.

Further features of the present disclosure will become apparent from the following description of exemplary embodiments with reference to the attached drawings.

BRIEF DESCRIPTION OF THE DRAWINGS

FIG. 10A illustrates an example of a conventional temperature setting performed when an image analysis result of the (N+1)th page is unknown. FIG. 10B illustrates an example of a temperature setting performed when an image analysis result of the (N+1)th page is identified. FIG. 10C illustrates an example of a target fixing temperature setting performed by performing similar image determination when an image analysis result of the (N+1)th page is unknown.

FIG. 14 is an illustration of how FIGS. 14A and 14B are related. FIGS. 14A and 14B are flowcharts illustrating a processing flow of fixing temperature control according to a third exemplary embodiment.

DESCRIPTION OF THE EMBODIMENTS

Hereinafter, exemplary embodiments of the present disclosure will be described in detail with reference to the drawings. The following exemplary embodiments are not intended to limit the disclosure set forth in the appended claims, and not all the combinations of features described in the exemplary embodiments are essential to the solution of the disclosure.

Figure 1:
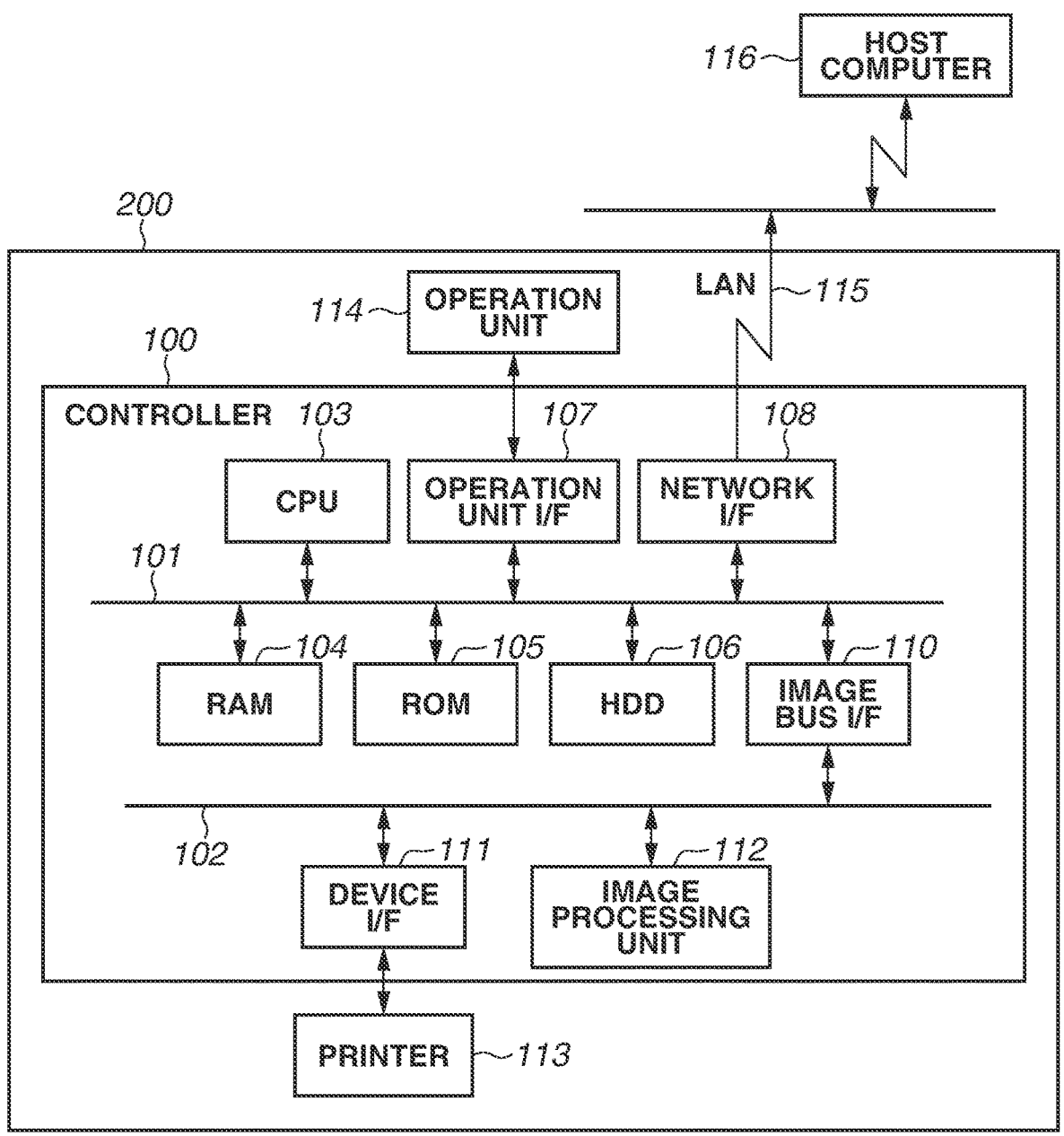
FIG. 1 illustrates a system configuration example.

FIG. 1 is a diagram illustrating a control system configuration of an image forming apparatus 200 according to a first exemplary embodiment that uses an electrophotographic method. The image forming apparatus 200 according to the present exemplary embodiment operates as an image processing apparatus that controls a fixing temperature for a fixing developer (e.g., toner) onto a recording medium such as a printing sheet.

The image forming apparatus 200 connects with a host computer 116 via a local area network (LAN) 115. The image forming apparatus 200 receives printing data including a rendering command, from the host computer 116.

A controller 100 controls an operation of the image forming apparatus 200. A central processing unit (CPU) 103 performs arithmetic processing for controlling the entire image forming apparatus 200. A random access memory (RAM) 104 is used as a memory for temporarily storing data, or a work memory. A read only memory (ROM) 105 stores a program to be executed by the CPU 103. A hard disk drive (HDD) 106 stores system software and image data. An operation unit interface (I/F) 107 is an interface unit to an operation unit 114, and outputs image data to be displayed on the operation unit 114, to the operation unit 114. The operation unit I/F 107 also has a function of conveying information input by a user from the operation unit 114, to the CPU 103. A network I/F 108 connects to the LAN 115 and performs input-output of information. These configurations are connected via a system bus 101. An image bus I/F 110 is a bus bridge that connects the system bus 101 and an image bus 102, and converts data structure. The image bus 102 includes a peripheral component interconnect (PCI) bus or a bus of IEEE1394. A device I/F 111 connects a printer 113 serving as an image forming apparatus and the controller 100, and performs synchronous/asynchronous conversion of image data.

An image processing unit 112 executes image processing on a bitmapped image. Examples of the image processing include color conversion processing, video count value acquisition processing, and pseudo halftone processing, which will be described below. Hereinafter, processing to be performed on image data for representing pseudo halftone such as grayscale will be sometimes referred to as halftone processing.

The printer 113 receives image data generated in a predefined image format, from the controller 100, and performs printing onto the surface of a transfer sheet fed by a feeding unit. The printer 113 executes printing onto the surface of a recording sheet serving as transfer material, by executing processing such as charging, exposure, development, transfer, and fixing, which will be described below.

<Configuration of Printer 113>

Figure 2:
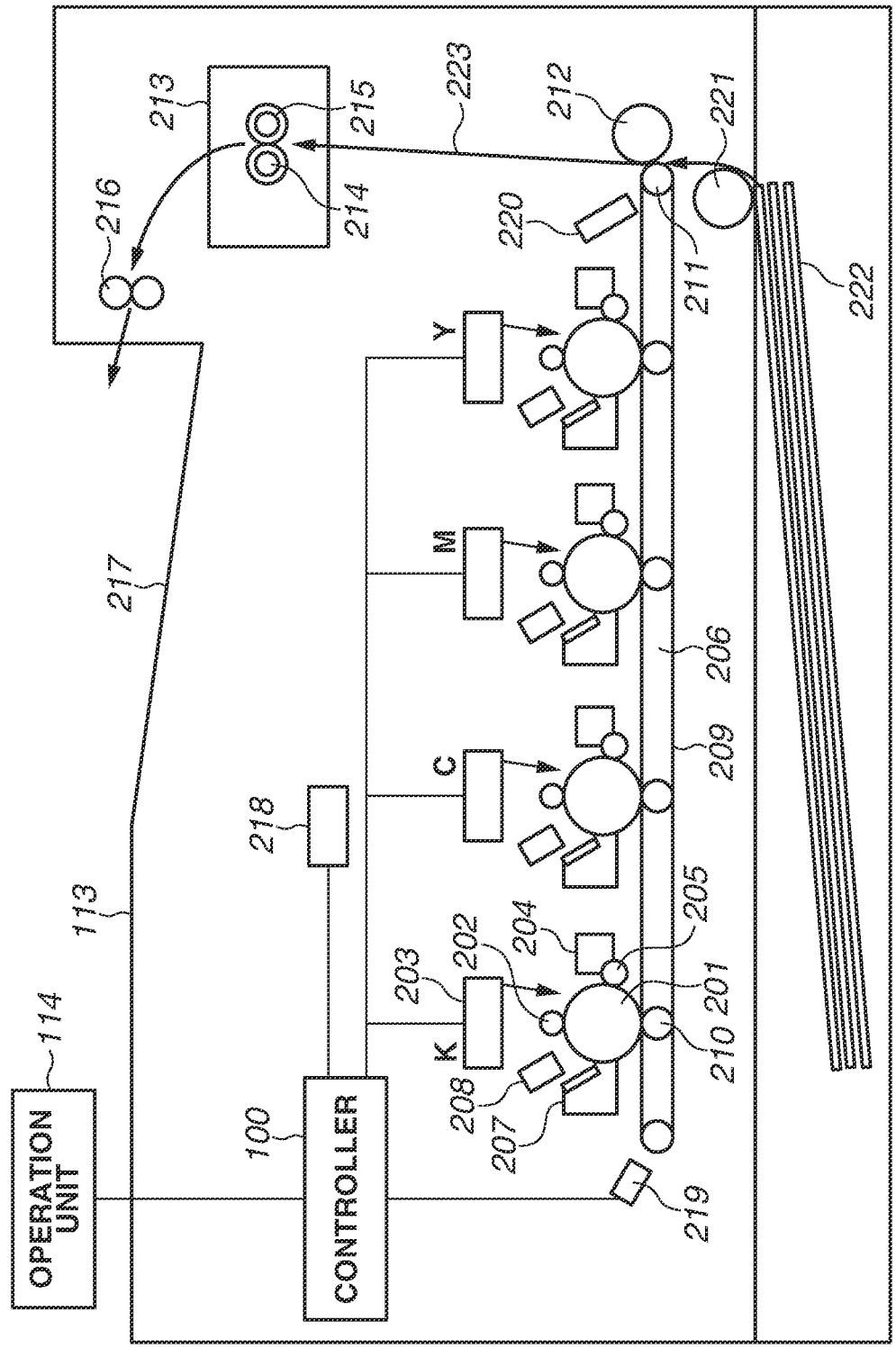
FIG. 2 illustrates a configuration example of an image forming apparatus.

FIG. 2 illustrates a configuration of the printer 113 according to the present exemplary embodiment. The printer 113 is a four-color full-color printer including four image forming units. Using four stations including yellow, magenta, cyan, and black stations that are arrayed in a line, the printer 113 forms toner images onto a recording medium (a recording sheet 222 in the present exemplary embodiment).

Each station includes a photosensitive drum 201 as an image bearing member that bears an electrostatic latent image. A charging unit 202, an exposure device 203, a development device 204, a cleaning device 207, and a preexposure unit 208 are arranged around the photosensitive drum 201. In the development device 204, a development roller 205 that supplies developer (toner in the present exemplary embodiment) to the photosensitive drum 201 is arranged. The development roller 205 is a developer bearing member that bears developer to be supplied to the electrostatic latent image formed on the photosensitive drum 201 serving as an image bearing member. An intermediate transfer unit 206 includes an intermediate transfer belt 209 and a primary transfer roller 210. The primary transfer roller 210 is arranged to face the photosensitive drum 201. In addition, a secondary transfer inner roller 211 and a secondary transfer roller 212 are arranged in such a manner that the intermediate transfer belt 209 rotates in a direction indicated by an arrow in a conveyance unit 223.

An environmental temperature and humidity sensor 218 detects the temperature and humidity in an installation environment of the printer 113, and notifies the detection result to the controller 100.

A density detection sensor 219 measures the density of a toner image transferred on the intermediate transfer belt 209, and notifies the measured density data to the controller 100.

A cleaning blade 220 performs cleaning by removing toner remaining on the intermediate transfer belt 209 without being transferred onto the recording sheet 222 during secondary transfer.

Next, a process up to printing onto a recording sheet will be described. In the printer 113 illustrated in FIG. 2, the photosensitive drum 201 is rotationally driven at a predetermined process speed in a clockwise direction during image formation.

Next, the surface of the photosensitive drum 201 is uniformly charged to negative polarity by the charging unit 202 performing bias application control from a bias power source (not illustrated).

Next, an electrostatic latent image is formed on the surface of the photosensitive drum 201 by exposure laser of the exposure device 203. In accordance with an image pattern that is based on an image signal transmitted from the controller 100, the exposure device 203 emits light from a laser chip provided in the exposure device 203. If scanning light is emitted onto the charged surface of the photosensitive drum 201, electric charge held on the surface of the photosensitive drum 201 is removed, and a surface potential of the photosensitive drum 201 increases. The electrostatic latent image is formed in this manner. The formation method of an electrostatic latent image is not limited to this, and any formation method will do as long as an electrostatic latent image is formed based on a potential difference from applied bias voltage.

Next, by development bias being applied to the development roller 205 serving as a developer bearing member that is provided in the development device 204, toner charged to negative polarity adheres to the photosensitive drum 201 via the development roller 205 and is developed as a toner image.

At this time, as a potential difference being a difference between an amount of exposure performed by the exposure device 203 and the development bias applied by the development roller 205 becomes larger, an amount of toner to be developed increases.

Next, the developed toner image is primarily transferred onto the surface of the intermediate transfer belt 209 from the photosensitive drum 201 at the primary transfer roller 210.

Next, the toner image primarily transferred on the intermediate transfer belt 209 is transferred onto the recording sheet 222 fed by a feeding roller 221.

Next, the recording sheet 222 on which the toner image is transferred is conveyed to a fixing device 213 via the conveyance unit 223 to be heated and pressed in the fixing device 213. The toner image is fixed onto the recording sheet 222 in this manner. The fixing device 213 is a fixing unit that performs fixing processing of fixing an image obtained by developing using developer the electrostatic latent image borne on the photosensitive drum 201, onto a recording medium.

The recording sheet 222 on which the toner image is fixed by the fixing device 213 is discharged to a discharge tray 217 via a discharge roller 216.

<Details of Fixing Device 213>

Figure 3:
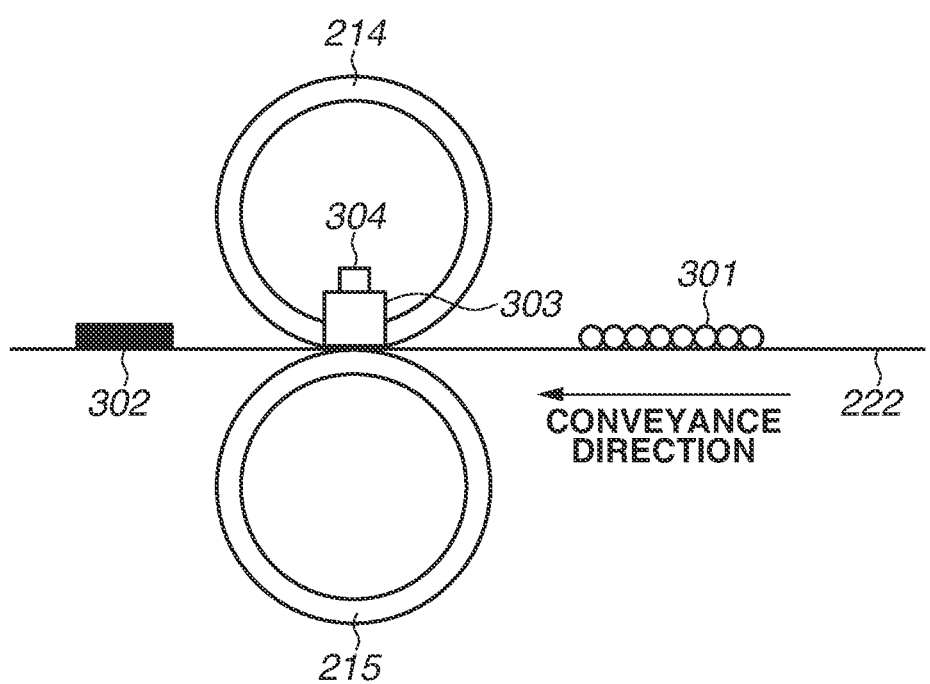
FIG. 3 illustrates a configuration example of a fixing unit.

Next, the fixing device 213 according to the present exemplary embodiment will be described with reference to FIG. 3.

The fixing device 213 according to the present exemplary embodiment includes a fixing roller 214 and a pressing roller 215. By the pressing roller 215 being pressed toward the fixing roller 214, a fixing nip portion is generated between the rollers.

The fixing roller 214 includes a heater (heating device) 303 and a thermistor 304. By heat energy generated by the heater 303, unfixed toner 301 is fixed onto the recording sheet 222. More specifically, when the recording sheet 222 on which the unfixed toner 301 is transferred is conveyed to the fixing nip portion, heat of the surface of the fixing roller 214 is conveyed to the unfixed toner 301 and the recording sheet 222, and fixed toner 302 is fixed onto the surface of the recording sheet 222.

The thermistor 304 outputs an analog signal by varying a resistance value in accordance with the temperature of the heater 303. The analog signal output from the thermistor 304 is converted into a digital signal by an analog-to-digital (A/D) converter (not illustrated). The printer 113 can detect the temperature of the heater 303 based on the digital signal. The detected temperature is notified to the CPU 103 of the controller 100 from the printer 113.

In the case of performing printing using only black toner, for example, because a toner applied amount is small, an amount of required heat becomes small as well. Thus, by setting a low fixing temperature for an image with a low toner applied amount, it is possible to reduce power consumption. On the other hand, if a high toner applied amount region of a predetermined size is included in an image, an amount of heat required for fixing becomes large. If fixing is performed in a state where a fixing temperature is not high enough, a fixing failure occurs.

<Details of Image Processing Unit 112>

Figure 4:
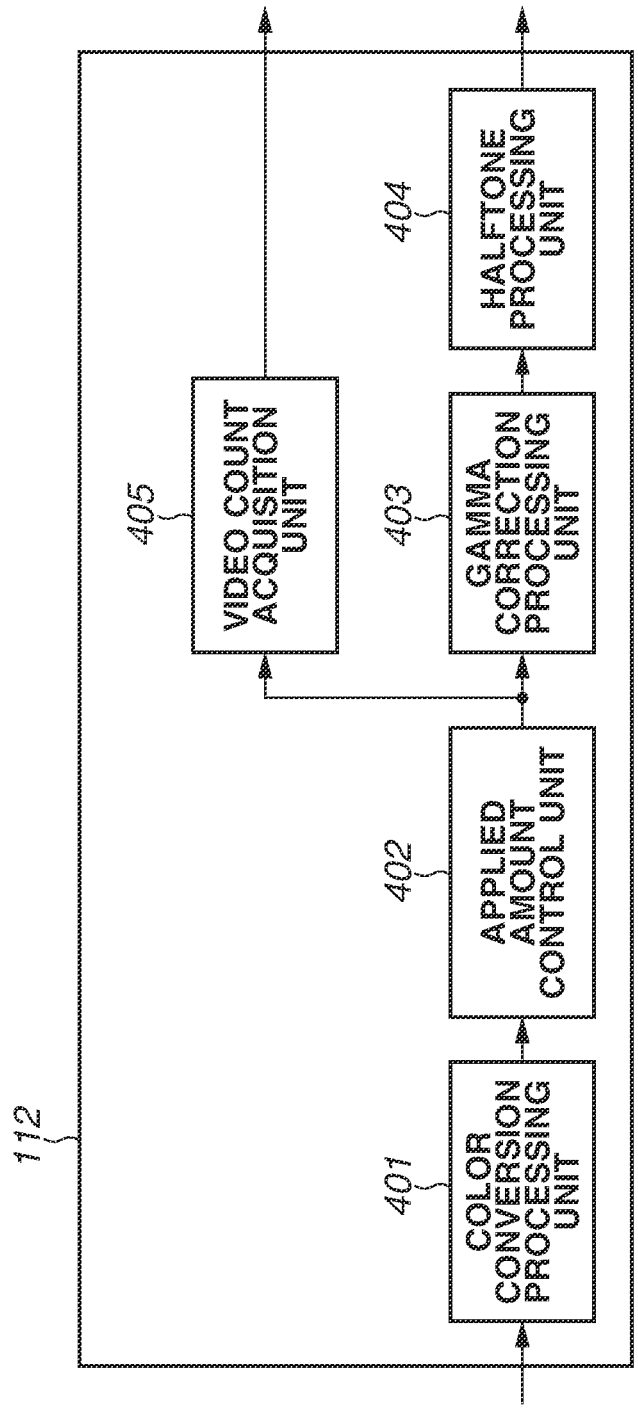
FIG. 4 is a block diagram of an image processing unit.

FIG. 4 is a block diagram illustrating a configuration of the image processing unit 112.

A color conversion processing unit 401 performs conversion processing of converting RGB color space data into CMYK color space data. The RGB color space data is generated by the CPU 103 performing rendering in accordance with a rendering command received from the host computer 116.

An applied amount control unit 402 corrects a signal value of CMYK color space data in such a manner that a toner applied amount does not exceed the maximum toner applied amount with which printing can be performed by the printer 113. For example, the maximum applied amount is controlled by replacing a CMY signal value at which the respective densities of CMY are equal, to a K signal value. By representing gray, which is represented by overlapping cyan toner, magenta toner, and yellow toner, only using black toner, it is possible to reduce an amount of toner to be fixed onto the recording sheet 222.

The toner applied amount in the present exemplary embodiment refers to a value indicating an amount of toner to be fixed onto the recording sheet 222. The toner applied amount is determined for each color of CMYK. In the present exemplary embodiment, the toner applied amount is represented as a proportion of the number of colored pixels out of all the pixels in a region with a predetermined size in image data. By adding toner applied amounts of all colors, a total toner applied amount of the region with the predetermined size is determined. The maximum toner applied amount refers to the largest toner applied amount among total toner applied amounts of regions in image data. The calculation method of the toner applied amount will be described in detail below.

A gamma correction processing unit 403 performs gamma correction of correcting the density of CMYK image data based on density characteristics unique to a printer engine. For example, gamma correction can be performed by a method of using a density correction table associating an input density level and an output density level for each color of CMYK, or a method of obtaining density by calculation using a function.

A halftone processing unit 404 performs halftone processing on the CMYK image data with density corrected by the gamma correction processing unit 403, using an error diffusion method or a dither method. The halftone processing is processing to be performed based on an image signal for representing pseudo halftone such as greyscale. In the present exemplary embodiment, the description will be given assuming that an output of the halftone processing unit 404 is converted into binary data (1 indicates an on-pixel and 0 indicates an off-pixel), but an output is not limited to binary data. In the present exemplary embodiment, the description will be given assuming that image data processed by the halftone processing unit 404 is stored in the HDD 106, but the storage location is not limited to this, and the processed image data may be stored in the RAM 104.

A video count acquisition unit 405 acquires a video count value in a page based on a CMYK signal (image signal) converted by the applied amount control unit 402. At this time, multiple-valued signals of each color of CMYK are integrated, and a sum of each color of C, M, Y, and K included in one page is acquired as a video count value of each color. The video count value is a predicted value of amount of toner (developer) to be used in printing processing, and is identified based on an image signal value. The video count value is used for predicting a supply amount and a consumed amount of toner. The video count value acquired by the video count acquisition unit 405 is stored into the HDD 106 together with image data processed by the halftone processing unit 404.

In a case where printing data includes a plurality of pages, image data and a video count value generated by the image processing unit 112 are stored into the HDD 106 by each page. In the present exemplary embodiment, a video count value of an (N+1)th page is determined before fixing of an N-th page.

<Printing Processing Flow>

Figure 5:
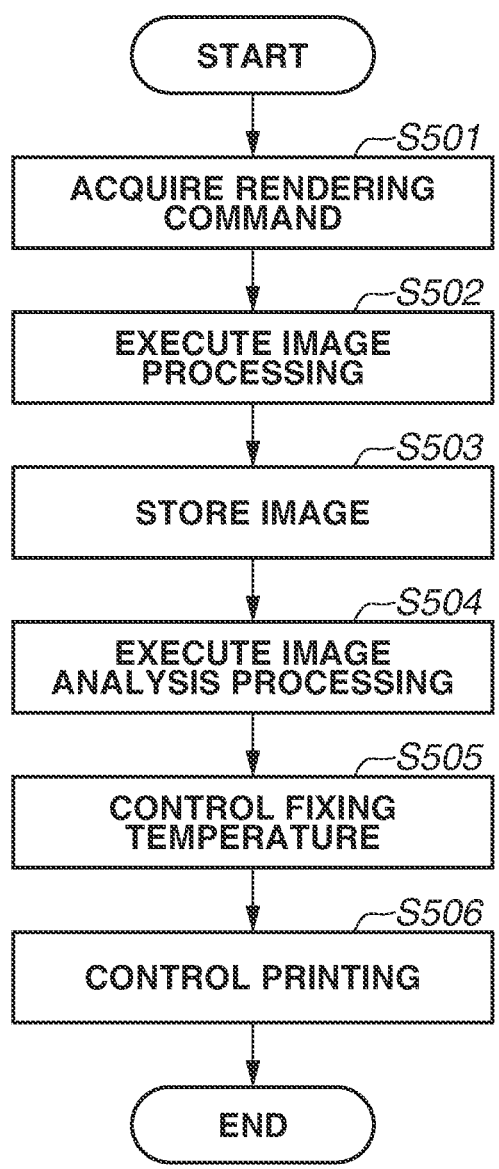
FIG. 5 is a flowchart illustrating a printing processing flow.

FIG. 5 is a flowchart illustrating a processing flow of printing control according to the present exemplary embodiment.

A program for executing the flowchart is stored in any device of the ROM 105, the RAM 104, and the HDD 106, and is executed by the CPU 103 when printing data is received from the host computer 116.

In step S501, the CPU 103 receives a rendering command included in printing data received from the host computer 116. Bitmap data is generated.

Next, in step S502, the CPU 103 performs control for executing image processing that is based on received rendering data. In the image processing in step S502, bitmap data is generated based on the rendering data. The generation of the bitmap data can be executed by a processor provided separately from the CPU 103 based on an instruction from the CPU 103.

Furthermore, in the image processing in step S502, the generated bitmap data is input to the image processing unit 112, and processed halftone image data is obtained. In addition, a video count value is obtained by the image processing unit 112.

In step S503, the CPU 103 stores the processed halftone image data into the HDD 106. Although the image data is stored into the HDD 106 in this example, the image data may be stored into the RAM 104. The video count value generated by the image processing unit 112 is also stored in this step.

Next, in step S504, the CPU 103 executes image analysis processing on the processed halftone image data stored in the HDD 106. The CPU 103 acquires, for each page, a value indicating an amount of developer (toner, etc.) to be applied onto a recording medium (printing sheet, etc.). An image analysis processing program in the present exemplary embodiment is stored in any device of the ROM 105, the RAM 104, and the HDD 106, and is executed by the CPU 103. The image analysis processing will be described in detail below.

Next, in step S505, the CPU 103 determines the temperature of the fixing device 213 for each page in accordance with an analysis result obtained by the image analysis processing. The fixing temperature control to be performed in accordance with an image analysis result will be described below.

Next, in step S506, the CPU 103 confirms that the temperature of the heater 303 is set to the fixing temperature determined in step S505, and then, controls the printer 113 to execute printing.

<Processing Flow of Image Analysis Processing>

Next, the details of the image analysis processing according to the present exemplary embodiment will be described with reference to FIGS. 6 and 7A to 7D.

Figure 6:
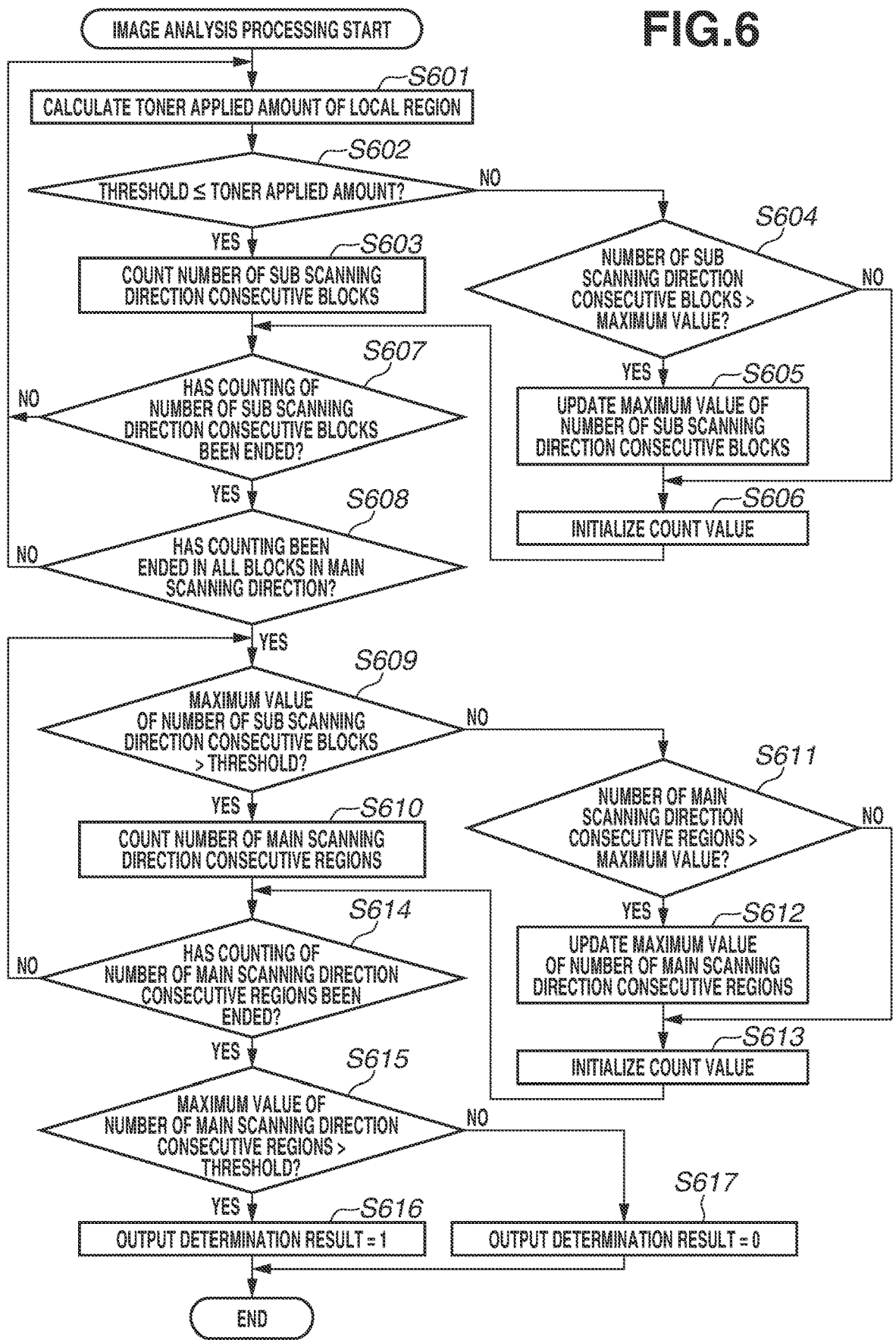
FIG. 6 is a flowchart illustrating a processing flow of image analysis processing.

FIG. 6 is a flowchart illustrating the details of the image analysis processing performed in step S504 for analyzing image data according to the present exemplary embodiment. A program for executing the flowchart is stored in any device of the ROM 105, the RAM 104, and the HDD 106, and is executed by the CPU 103.

In step S601, the CPU 103 analyzes processed halftone binary image data stored in the HDD 106, and calculates a toner applied amount TnrSum in a predetermined window size (e.g., 16×16 pixels, will be sometimes referred to as a local region). For example, the CPU 103 obtains a proportion (on-pixel ratio) of the number of pixels (on-pixels) having data indicating 1, among all pixels (256 pixels in the case of 16×16 pixels) in the predetermined window size. A toner applied amount of one color when the number of on-pixels in the predetermined window size is 128 is (128/256)×100=50%.

The CPU 103 calculates the total toner applied amount TnrSum by adding toner applied amounts of the respective colors of C, M, Y, and K. For example, in a case where a cyan toner applied amount is 50%, a magenta toner applied amount is 30%, a yellow toner applied amount is 20%, and a black toner applied amount is 10% in the region with the predetermined window size, the total toner applied amount is represented as 110%. In this manner, the CPU 103 acquires, for each of a plurality of regions included in one page, a value indicating an amount of developer to be applied.

Figure 7A:
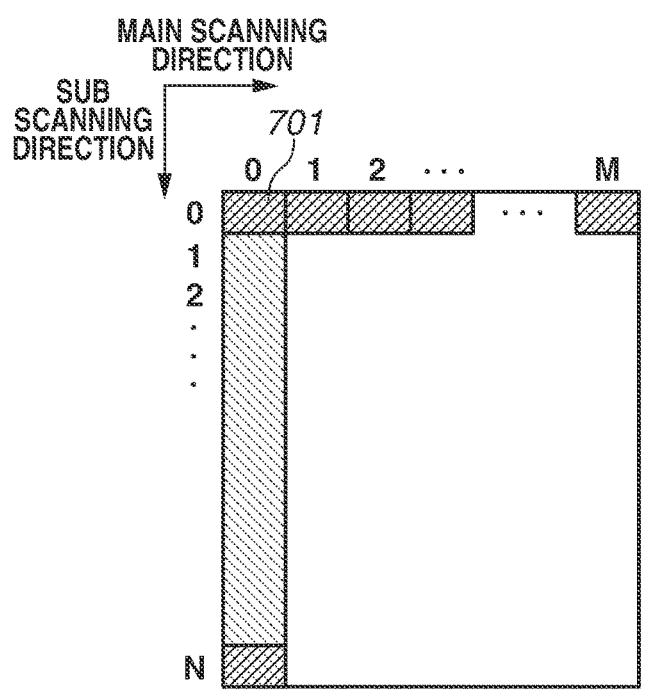
FIGS. 7A to 7D illustrate an example of image analysis processing.

FIG. 7A illustrates an example in which a block with a predetermined window size is arranged in image data. A block 701 is a block with a predetermined window size, and a toner applied amount is calculated in units of the blocks.

Next, in step S602, the CPU 103 determines whether the toner applied amount calculated in step S601 is larger than or equal to a predesignated threshold. If it is determined in this step that the calculated toner applied amount is larger than or equal to the threshold (YES in step S602), the processing proceeds to step S603. If it is determined that the calculated toner applied amount is smaller than the threshold (NO in step S602), the processing proceeds to step S604.

As an example of a predesignated threshold range, TnrSum<150% is set, but the threshold range is not limited to this, and any threshold range can be set based on a toner applied amount at which a fixing failure occurs.

Next, in step S603, the CPU 103 counts the number of blocks that have been determined in step S602 to have toner applied amounts falling within the threshold range and are arranged consecutively in a sub scanning direction (conveyance direction of the recording sheet) (the number of sub scanning direction consecutive blocks). The number of sub scanning direction consecutive blocks is counted for each main scanning position of a block. By counting the number of sub scanning direction consecutive blocks, it is possible to identify the size in the sub scanning direction of a region having a predetermined toner applied amount.

Next, in step S604, the CPU 103 determines whether the number of sub scanning direction consecutive blocks counted in step S603 has updated the maximum value of the number of sub scanning direction consecutive blocks. If the number of sub scanning direction consecutive blocks has updated the maximum value (YES in step S604), the processing proceeds to step S605. If the number of sub scanning direction consecutive blocks has not updated the maximum value (NO in step S604), the processing proceeds to step S606. In addition, a default value of the maximum value of the number of sub scanning direction consecutive blocks is set to 0.

In step S605, the CPU 103 updates the maximum value of the number of sub scanning direction consecutive blocks, and stores the maximum value into the RAM 104.

In step S606, the CPU 103 initializes a count value of the number of sub scanning direction consecutive blocks. At this time, a default value is set to 0.

In step S607, the CPU 103 determines whether the counting of the number of sub scanning direction consecutive blocks at one main scanning position has been ended. If the processing has been ended (YES in step S607), the processing proceeds to step S608. If the processing on sub scanning direction blocks has not been ended (NO in step S607), the processing shifts to the next block in the sub scanning direction, and the processing returns to step S601. The processing is repeated up to an N-th block in the sub scanning direction. When the processing flow proceeds to step S608, the maximum value of the number of sub scanning direction consecutive blocks at one main scanning position is stored in the RAM 104.

In step S608, the CPU 103 determines whether the counting of the number of sub scanning direction consecutive blocks has been ended in all blocks in a main scanning direction. If the counting has been ended up to an M-th block in the main scanning direction (YES in step S608), the processing proceeds to step S609. If the counting has not been ended up to the M-th block in the main scanning direction (NO in step S608), the processing shifts to the next main scanning position and the processing returns to the processing in step S601.

Figure 7B:
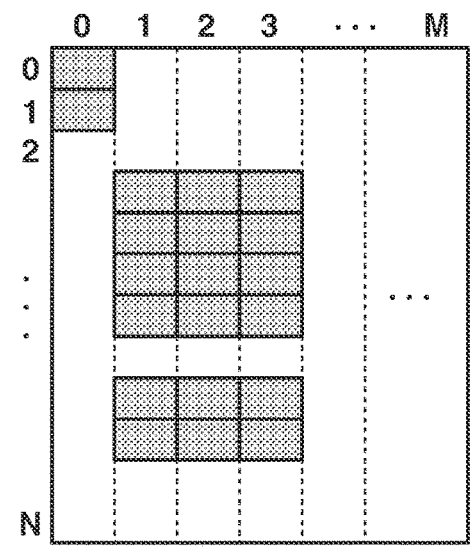

FIG. 7B illustrates the arrangement of blocks determined in step S602 to have toner applied amounts falling within the threshold range. In the case of FIG. 7B, the maximum value of the number of sub scanning direction consecutive blocks at the position of a main scanning position 0 is 2. In addition, in the case of FIG. 7B, at the positions of main scanning positions 1 to 3, the maximum value of the number of sub scanning direction consecutive blocks is 4. When the processing flow shifts to step S609, the maximum value of the number of sub scanning direction consecutive blocks corresponding to main scanning positions 0 to M is stored in the RAM 104.

Next, in step S609, the CPU 103 determines whether the maximum value of the number of sub scanning direction consecutive blocks at each main scanning position exceeds a predetermined threshold (e.g., 8). At this time, eight blocks being the predetermined threshold correspond to approximately 5 mm when resolution is 600 dots per inch (dpi). If it is determined in this step that the maximum value exceeds the threshold (YES in step S609), the processing proceeds to step S610. If it is determined that the maximum value does not exceed the threshold (NO in step S609), the processing proceeds to step S611.

In step S610, the CPU 103 counts the number of regions that have been determined in step S609 to have the maximum value exceeding the threshold and are consecutively arranged in the main scanning direction (the number of main scanning direction consecutive regions). By counting the number of main scanning direction consecutive regions, it is possible to identify the size in the main scanning direction of a region having a predetermined toner applied amount.

In step S611, the CPU 103 determines whether the number of main scanning direction consecutive regions counted in step S610 has updated the maximum value of the number of main scanning direction consecutive regions. If the number of main scanning direction consecutive regions has updated the maximum value of the number of main scanning direction consecutive regions (YES in step S611), the processing proceeds to step S612. If the number of main scanning direction consecutive regions has not updated the maximum value of the number of main scanning direction consecutive regions (NO in step S611), the processing proceeds to step S613. A default value of the maximum value of the number of main scanning direction consecutive regions is set to 0.

In step S612, the CPU 103 updates the maximum value of the number of main scanning direction consecutive regions and stores the maximum value into the RAM 104.

In step S613, the CPU 103 initializes a count value of the number of main scanning direction consecutive regions. At this time, a default value is set to 0.

In step S614, the CPU 103 determines whether the counting of the number of main scanning direction consecutive regions in the main scanning direction has been ended. If the processing has been ended (YES in step S614), the processing proceeds to step S615. If the processing has not been ended (NO in step S614), the processing shifts to the next main scanning position and the processing returns to step S609. The processing is repeated up to the main scanning position M. Through the processing in steps S609 to S614, it is possible to count the number of main scanning direction consecutive regions in a region in which the maximum value of the number of sub scanning direction consecutive blocks is larger than the threshold. If the maximum value of the number of sub scanning direction consecutive blocks falls below the threshold (NO in step S609), a count value of the number of main scanning direction consecutive regions is initialized (step S613). In addition, through the processing in steps S611 and S612, it is possible to acquire the maximum number of consecutive regions among the numbers of main scanning direction consecutive regions in the region in which the maximum value of the number of sub scanning direction consecutive blocks is larger than the threshold.

In step S615, the CPU 103 determines whether the maximum value of the number of main scanning direction consecutive regions exceeds a predetermined threshold (e.g., 8). If it is determined in this step that the maximum value exceeds the threshold (YES in step S615), the processing proceeds to step S616. If it is determined that the maximum value does not exceed the threshold (NO in step S615), the processing proceeds to step S617.

Figure 7C:
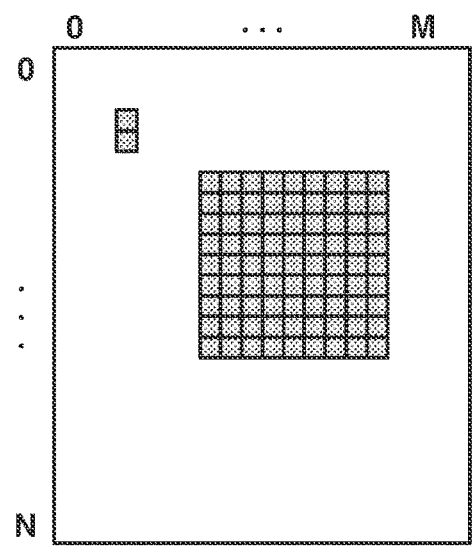

In step S616, the CPU 103 determines that a region having an applied amount falling within the predetermined range and a predetermined area is detected in image data, outputs an image analysis result=1, and ends the processing. In the present exemplary embodiment, in a case where an image analysis result indicates 1, a toner applied amount of the page is regarded as "high". FIG. 7C illustrates an example of an image in which the maximum value of the number of sub scanning direction consecutive blocks exceeds 8, the maximum value of the number of main scanning direction consecutive regions also exceeds 8, and an image analysis result=1 is obtained.

Figure 7D:
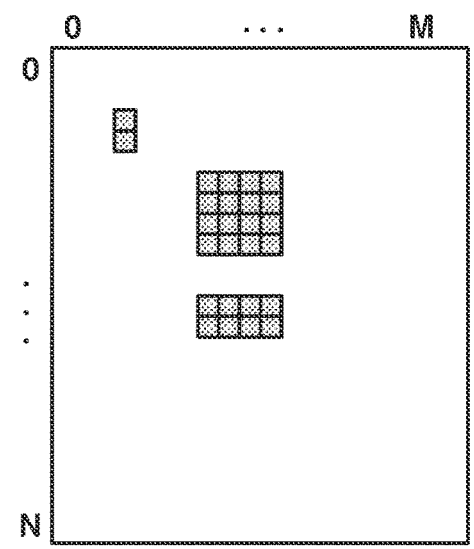

In step S617, the CPU 103 determines that a region having an applied amount falling within the predetermined range and a predetermined area is not detected in image data, outputs an image analysis result=0, and ends the processing. In the present exemplary embodiment, in a case where an image analysis result indicates 0, a toner applied amount of the page is regarded as "low". FIG. 7D illustrates an example of an image in which the maximum value of the number of sub scanning direction consecutive blocks is 4, the maximum value of the number of main scanning direction consecutive regions is 0, and an image analysis result=0 is obtained. The image analysis result is stored into the RAM 104 in association with a page including the analyzed image.

Through the processing in the flowchart illustrated in FIG. 6, it is possible to detect a high toner applied amount portion having a predetermined area. With this configuration, in printing image data by the printer 113, it is possible to set a low fixing temperature for a low toner applied amount image and achieve power saving. On the other hand, it is possible to set a high fixing temperature for a high toner applied amount image, and prevent the occurrence of a fixing failure.

<Fixing Temperature Control Flow>

In the present exemplary embodiment, in the flowchart illustrated in FIG. 5, the image analysis processing in step S505 is implemented by software processing. This is because a toner applied amount or an image area that is to be detected varies depending on the configuration of the printer such as an installation position of a fixing member or a heater. On the other hand, the CPU 103 that executes the image analysis processing is used as a controller that controls the entire image forming apparatus. Thus, if a competitive operation such as simultaneous execution of a scan job and a print job occurs, the occupancy of the CPU 103 for job control becomes higher, and a priority order and performance of the image analysis processing deteriorate in some cases. In a case where the performance of the CPU 103 deteriorates and an image analysis result cannot be acquired, a fixing temperature is controlled to be a temperature at which toner can be fixed even when a toner applied amount is maximum. Accordingly, in such a case, power saving sometimes fails to be achieved.

Figure 8A:
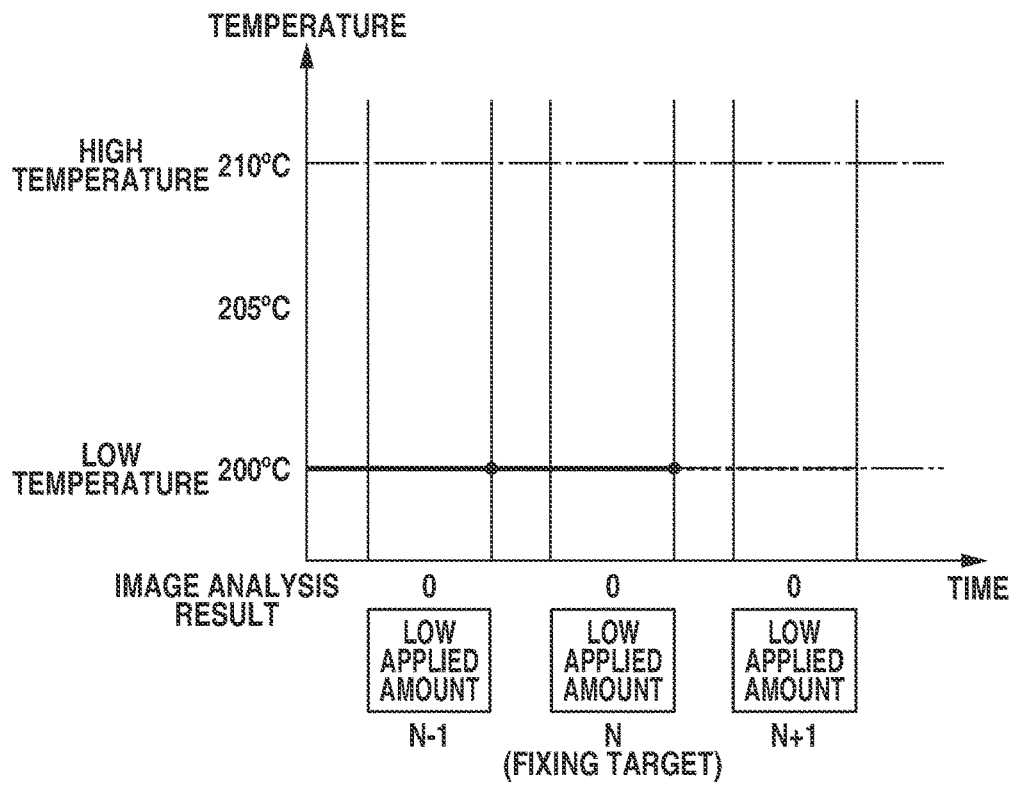
FIG. 8A illustrates an example of fixing temperature control performed when an analysis result of an (N+1)th page is identified.
Figure 8B:
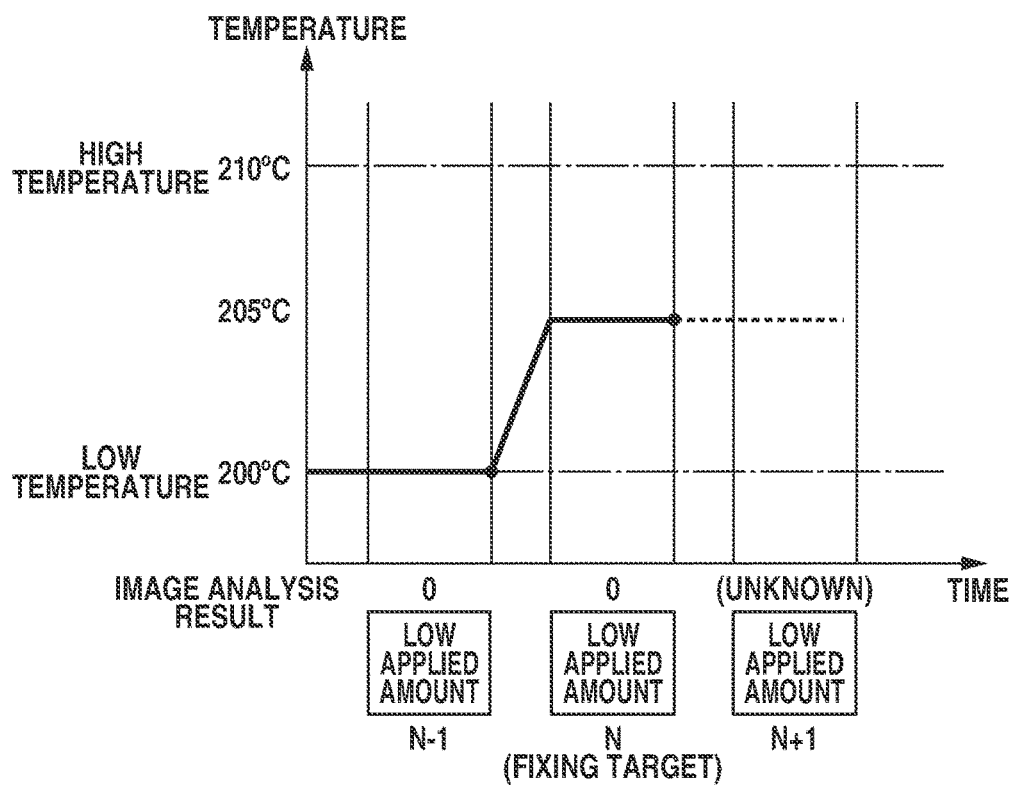
FIG. 8B illustrates an example of fixing temperature control performed when an analysis result of the (N+1)th page is not identified.

FIGS. 8A and 8B each illustrate an example of temperature control performed when a result of image analysis processing is determined according to the present exemplary embodiment. In the present exemplary embodiment, the description will be given of an example in which fixing temperature control is performed by fixing an (N−1)th page, and then, holding image analysis results of an N-th page to be fixed next, and an (N+1)th page subsequent to the N-th page. The description will be given of an example in which an image on the (N−1)th page is a low toner applied amount image (image analysis result=0). In the following example, fixing temperature control is performed by classifying toner applied amounts of pages into "low" or "high". In the flowchart illustrated in FIG. 6, if a determination result indicates 1 (step S616), a toner applied amount is regarded as "high". In addition, in the flowchart illustrated in FIG. 6, if a determination result indicates 0 (step S617), a toner applied amount is regarded as "low".

In FIG. 8A, because images on the N-th page and the (N+1)th page are low toner applied amount images, the fixing temperature of the N-th page to be fixed is controlled to be low temperature. If an image on the (N+1)th page is a high toner applied amount image, because the temperature of the heater 303 needs to be increased from the fixing timing of the N-th page, fixing control for fixing the N-th page at high temperature is performed. Nevertheless, if an image on the (N+1)th page is a low toner applied amount image, as illustrated in FIG. 8A, fixing control for fixing the N-th page at low temperature is performed.

FIG. 8B illustrates an example of temperature control performed when an image analysis result of the (N+1)th page cannot be acquired and toner applied amount information is unknown. In this case, while toner applied amount information of a subsequent page is unknown, the temperature needs to reach high temperature at the time of fixing the (N+1)th page. This is for surely fixing the (N+1)th page. In this case, before a fixing start of the N-th page, a temperature setting needs to be controlled to high temperature.

In the present exemplary embodiment, the description will be given of processing of performing appropriate temperature control by using an image analysis result of the N-th page and video count values of the N-th page and the (N+1)th page even in a case where an image analysis result of a subsequent page ((N+1)th page) cannot be acquired.

Figure 9:
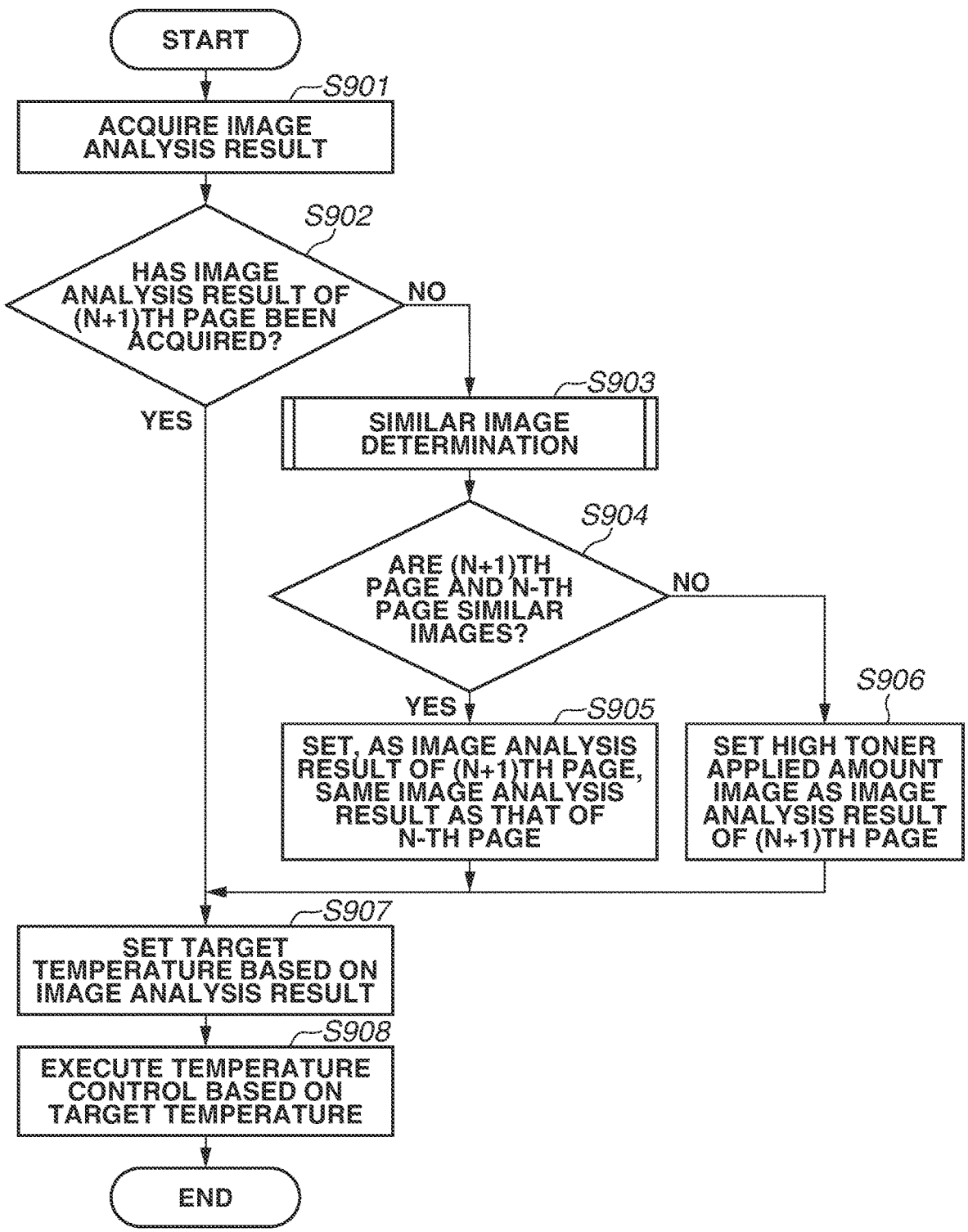
FIG. 9 is a flowchart illustrating a processing flow of fixing temperature control according to a first exemplary embodiment.

Hereinafter, the processing of fixing temperature control according to the present exemplary embodiment will be described in detail with reference to FIG. 9. FIG. 9 is a flowchart illustrating fixing temperature control according to the present exemplary embodiment. A program for executing the flowchart is stored in any device of the ROM 105, the RAM 104, and the HDD 106, and is executed by the CPU 103 before fixing of the N-th page.

In step S901, the CPU 103 acquires an image analysis processing result. The image analysis processing result includes a value (0 or 1) of a determination result obtained by executing the processing illustrated in FIG. 6, for example.

Next, in step S902, the CPU 103 determines whether an image analysis result of the (N+1)th page has been acquired. If an image analysis result of the (N+1)th page has been acquired (YES in step S902), the processing proceeds to step S907. If an image analysis result of the (N+1)th page has not been acquired (NO in step S902), the processing proceeds to step S903.

In step S903, the CPU 103 determines whether an image on the (N+1)th page and an image on the N-th page are similar images. In the present exemplary embodiment, the CPU 103 determines whether the image on the (N+1)th page and the image on the N-th page are similar images, by comparing video count values of the (N+1)th page and the N-th page. The processing of determining whether the image on the (N+1)th page and the image on the N-th page are similar images will be described in detail below with reference to FIG. 12.

In step S904, the CPU 103 determines whether the image on the (N+1)th page and the image on the N-th page have been determined to be similar images in the similar image determination in step S903. In a case where the image on the (N+1)th page and the image on the N-th page have been determined to be similar images (YES in step S904), the processing proceeds to step S905. In a case where the image on the (N+1)th page and the image on the N-th page have been determined in step S904 to be dissimilar images (NO in step S904), the processing proceeds to step S906.

In step S905, the CPU 103 sets, as a toner applied amount of the (N+1)th page, an image analysis result of the N-th page. This is because, if image analysis is applied to the (N+1)th page, the same result as that of the N-th page is estimated to be obtained since the image on the N-th page and the image on the (N+1)th page are similar images. By setting an image analysis result of the N-th page as a toner applied amount of the (N+1)th page, it is possible to estimate the (N+1)th page to be fixed at the same fixing temperature as a fixing temperature of the N-th page, and accordingly determine a fixing temperature for printing image data of the N-th page.

In step S906, the CPU 103 sets, as an image analysis result of the (N+1)th page, an image analysis result indicating a high toner applied amount image. This is for securing a fixing property when an image on the (N+1)th page is a high toner applied amount image. In this manner, in a case where it is determined that image data of the N-th page and image data of the (N+1)th page are dissimilar, it is possible to estimate the (N+1)th page to be fixed at a predetermined fixing temperature (e.g., "high"), and accordingly determine a fixing temperature for printing image data of the N-th page.

In step S907, the CPU 103 controls a fixing temperature for printing image data based on a set image analysis result of the N-th page and an image analysis result of the (N+1)th page.

In this manner, if an analysis result of image data of the (N+1)th page has been acquired among image data, the image forming apparatus 200 according to the present exemplary embodiment determines a fixing temperature in the following manner More specifically, a fixing temperature for printing image data of the N-th page is determined at least based on an analysis result of image data of the N-th page and the analysis result of image data of the (N+1)th page among image data.

In addition, if an analysis result of image data of the (N+1)th page has not been acquired among image data, the image forming apparatus 200 according to the present exemplary embodiment determines a fixing temperature in the following manner More specifically, a fixing temperature for printing image data of the N-th page is determined at least based on a result of determination as to whether image data of the N-th page and image data of the (N+1)th page are similar, and an analysis result of image data of the N-th page.

Next, in step S908, the CPU 103 sets a target fixing temperature based on image analysis results of the N-th page and the (N+1)th page, and a fixing temperature of a previous page ((N−1)th page). FIGS. 10A to 10C each illustrate a setting example of a target fixing temperature according to the present exemplary embodiment. In the example, a target fixing temperature is set based on a fixing temperature of the (N−1)th page (fixed page) and image analysis results of the N-th page and the (N+1)th page.

FIG. 10A illustrates a setting example of a target fixing temperature set when an image analysis result of the (N+1)th page is unknown and the processing in steps S903 to S906 is not executed. FIG. 10B illustrates a setting example of a target fixing temperature set when an image analysis result of the (N+1)th page is determined in the present exemplary embodiment. FIG. 10C illustrates a setting example of a target fixing temperature set by performing similar image determination (step S903) when an image analysis result of the (N+1)th page is unknown in the present exemplary embodiment.

For example, in a case where a fixing temperature of the (N−1)th page is 200° C. and image analysis results of the N-th page and the (N+1)th page both indicate a low toner applied amount, if an image analysis result of the (N+1)th page is unknown, a target fixing temperature is set to 205° C. This is for preventing a fixing failure from occurring when an image on the (N+1)th page is a high toner applied amount image. On the other hand, if it has been determined according to the present embodiment that an image on the N-th page is a low toner applied amount image, and an image on the (N+1)th page is a similar image to the low toner applied amount image, a target fixing temperature is set to 200° C. With this configuration, when low toner applied amount images are consecutively printed as in the case of printing data mainly including character information, for example, it becomes possible to continue to control a fixing temperature at a low fixing temperature.

<Determination Processing of Similar Images>

Figure 12:
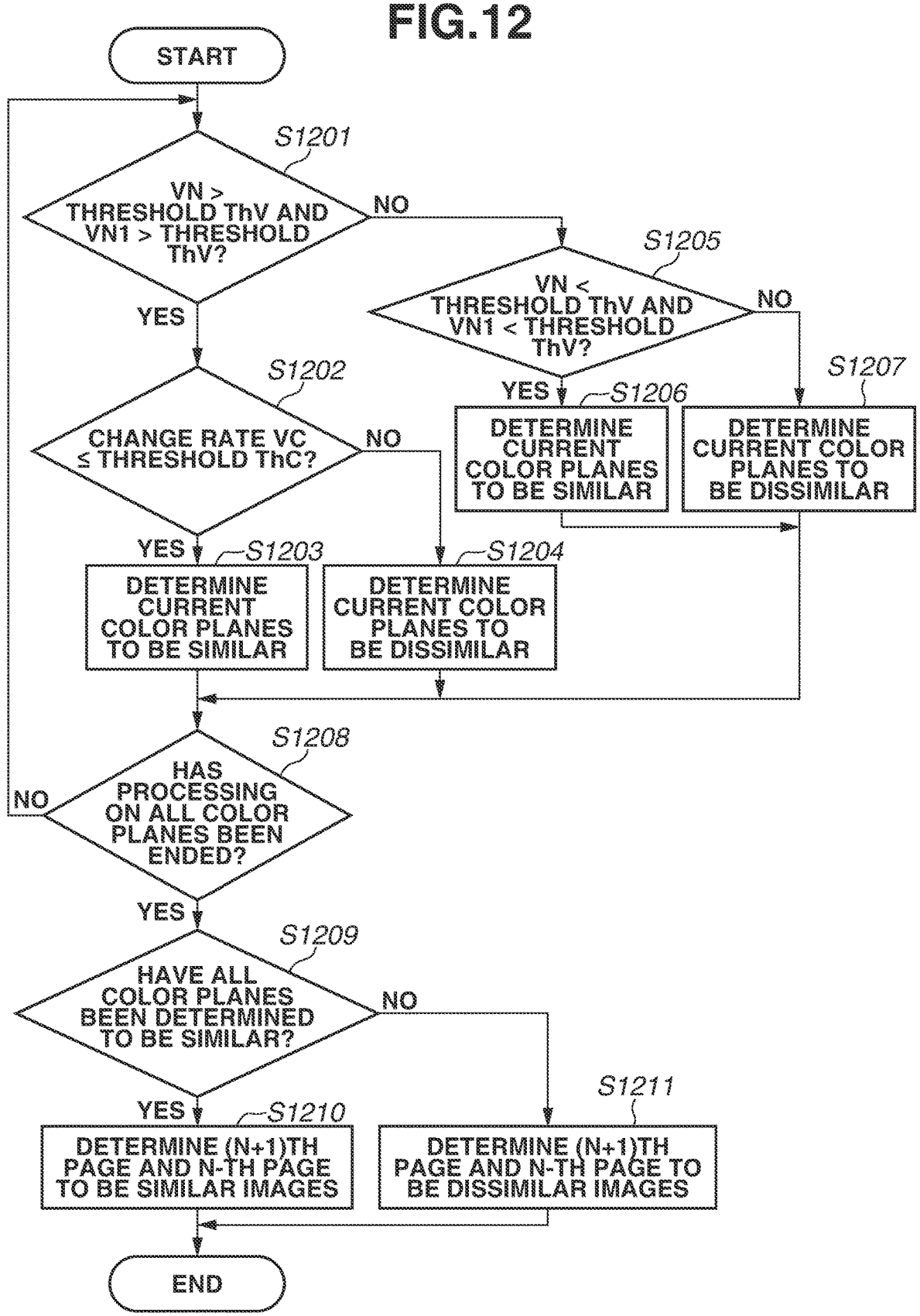
FIG. 12 is a flowchart illustrating a processing flow of similar image determination according to the first exemplary embodiment.

The determination processing of similar images in step S903 in FIG. 9 will be described in detail with reference to a flowchart illustrated in FIG. 12. A program for executing the flowchart is stored in any device of the ROM 105, the RAM 104, and the HDD 106, and is executed by the CPU 103.

In step S1201, the CPU 103 determines whether conditions VN1>ThV and VN>ThV are satisfied when a video count value of the (N+1)th page is denoted by VN1, a video count value of the N-th page is denoted by VN, and a threshold of the video count values is denoted by ThV. If the conditions are satisfied (YES in step S1201), the processing proceeds to step S1202. If the conditions are not satisfied (NO in step S1201), the processing proceeds to step S1205.

As the threshold ThV, a video count value can be set to a value obtained when a region has a size of 8×8 blocks and has a toner applied amount of 150%, the region being detected as a high toner applied amount region in the image analysis processing in step S504. In this example, a value calculated as a detected region size×the number of pixels in one block×((detection target toner applied amount/the number of colors)/100) is set. For example, when a detected region size=8×8, the number of pixels in one block=16×16, a detection target toner applied amount=150%, and the number of colors=4, the threshold ThV=6144 is set. The above-described threshold is not limited to this, and the threshold can be appropriately set by checking the influence of a high toner applied amount portion by test printing.

In step S1202, the CPU 103 determines whether a change rate VC of VN1 and VN is smaller than or equal to a threshold ThC. At this time, the change rate VC=ABS (100−(VN1/VN)×100) is calculated, where an ABS denotes a function representing an absolute value. If the change rate VC is smaller than or equal to the threshold ThC (YES in step S1202), the processing proceeds to step S1203. If the change rate VC is larger than the threshold ThC (NO in step S1202), the processing proceeds to step S1204.

Figure 11A:
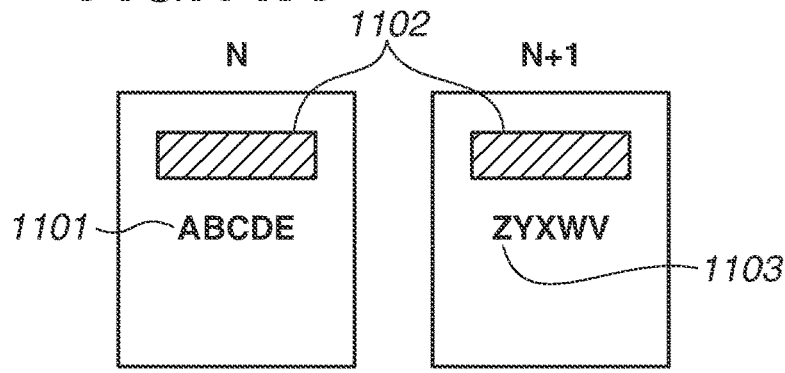
FIG. 11A illustrates an example of an image on the (N+1)th page that is determined to be a low toner applied amount image.
Figure 11B:
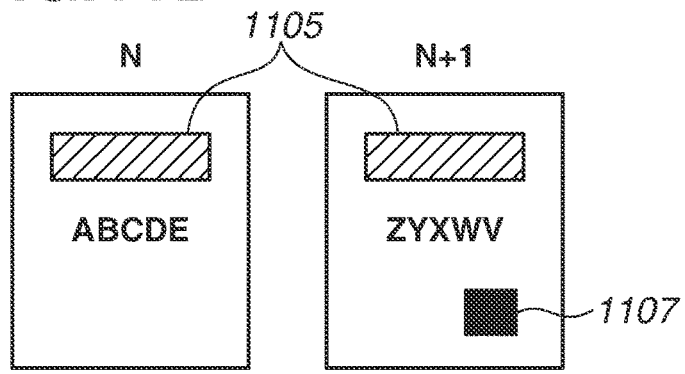
FIG. 11B illustrates an example of an image on the (N+1)th page that is determined to be a high toner applied amount image.

FIGS. 11A and 11B each illustrate an example of a low toner applied amount image and a high toner applied amount image according to the present exemplary embodiment. An image on the N-th page in FIG. 11A includes a character string 1101 that uses only black (100%), and a FIG. 1102 that uses 20% cyan, 10% magenta, 5% yellow, and 0% black. The image is an image determined to be a low toner applied amount image in the image analysis processing. An image on the (N+1)th page in FIG. 11A illustrates an image in which a character string 1103 different from that on the N-th page is drawn. The image on the (N+1)th page is also an image determined to be a low toner applied amount image in the image analysis processing. Video count value of the image on the N-th page include cyan 222000, magenta 111000, yellow 55000, and black 340000. Video count values of the image on the (N+1)th page include video count values similar to those of the N-th page as for cyan, magenta, and yellow, and a video count value 341000 as for black because the configuration of the character string is different. In the case of FIG. 11A, the change rates VC of the respective colors between the N-th page and the (N+1)th page are 0% for cyan, 0% for magenta, 0% for yellow, and 0.3% for black.

On the other hand, while an image on the N-th page illustrated in FIG. 11B is an image similar to the image on the N-th page illustrated in FIG. 11A, an image on the (N+1)th page illustrated in FIG. 11B includes a FIG. 1107 with a toner applied amount of 160% in total including 70% cyan, 70% magenta, 20% yellow, and 0% black. Thus, the image on the (N+1)th page illustrated in FIG. 11B is an image determined to be a high toner applied amount image. Video count values of the image on the (N+1)th page illustrated in FIG. 11B include cyan 232000, magenta 121000, yellow 57800, and black 341000. The change rates VC of the respective colors between the N-th page illustrated in FIG. 11B and the (N+1)th page illustrated in FIG. 11B are 4.3% for cyan, 8.3% for magenta, 4.8% for yellow, and 0.3% for black. Thus, for example, the threshold of the change rate can be set to 2%, but the threshold is not limited to this, and the threshold cab be set to any threshold that can identify a high toner applied amount. In the present exemplary embodiment, the same threshold ThC of the change rate VC is set for all color planes, but the threshold ThC may be made settable for each color. By determining a change rate of video count values in this manner, it is possible to determine whether images are similar images.

In step S1203, the CPU 103 determines the current color planes corresponding to VN1 and VN to be similar.

In step S1204, the CPU 103 determines the current color planes corresponding to VN1 and VN to be dissimilar.

In step S1205, the CPU 103 determines whether conditions VN1<ThV and VN<ThV are satisfied. If the conditions are satisfied (YES in step S1205), the processing proceeds to step S1206. If the conditions are not satisfied (NO in step S1205), the processing proceeds to step S1207.

In step S1206, the CPU 103 determines the current color planes corresponding to VN1 and VN to be similar.

In step S1207, the CPU 103 determines the current color planes corresponding to VN1 and VN to be dissimilar.

In step S1208, the CPU 103 determines whether the processing on all the color planes of CMYK has been ended. If the processing on all the color planes has been ended (YES in step S1208), the processing proceeds to step S1209. If the processing on all the color planes of CMYK has not been ended (NO in step S1208), the processing shifts to the next color plane and the processing returns to the processing in step S1201.

In step S1209, the CPU 103 determines whether all the color planes of CMYK have been determined to be similar. If all the color planes have been determined to be similar (YES in step S1209), the processing proceeds to step S1210. If any one color plane is determined to be dissimilar (NO in step S1209), the processing proceeds to step S1211.

In step S1210, the CPU 103 determines the image on the (N+1)th page and the image on the N-th page to be similar images.

In step S1211, the CPU 103 determines the image on the (N+1)th page and the image on the N-th page to be dissimilar images.

As described above, it is possible to determine whether an image on the N-th page and an image on the (N+1)th page are similar images. In the present exemplary embodiment, whether images on a plurality of pages included in image data are similar images is determined based on results of video count. The acquisition of video count values (step S502) can be performed before the image analysis processing (step S504) described with reference to FIG. 6. Accordingly, it is possible to determine whether an image on the N-th page and an image on the (N+1)th page are similar images using video count values even in a case where a result of image analysis processing of the (N+1)th page has not been acquired. Then, if the image on the (N+1)th page is determined to be a similar image, it is possible to estimate the (N+1)th page to be fixed at the same fixing temperature as a fixing temperature of the N-th page, and accordingly determine a fixing temperature for printing image data of the N-th page.

In this manner, in the present exemplary embodiment, whether images on a plurality of pages included in image data are similar images is determined based on information acquirable before image analysis for fixing temperature control. Accordingly, according to the present exemplary embodiment, it becomes possible to provide an image forming apparatus that can achieve power saving by appropriately performing temperature control even in a case where a result of image analysis processing cannot be acquired.

In the first exemplary embodiment, the description has been given of a method of performing temperature control by setting an image analysis result of the (N+1)th page by determining whether an image on the N-th page and an image on the (N+1)th page are similar images, in a case where an image analysis result of the (N+1)th page cannot be acquired.

Nevertheless, for example, some documents are created using a template including a preset background. Thus, in some cases, a different template is used at a switch timing of a printing job, and determination accuracy deteriorates in the similar image determination that uses video count values.

A second exemplary embodiment will be described. In the second exemplary embodiment, if an image analysis result of the (N+1)th page cannot be acquired, whether a printing job of the (N+1)th page is the same printing job as the N-th page is determined, and fixing temperature control in step S505 is performed.

Because an apparatus configuration according to the present exemplary embodiment is similar to the configuration described in the first exemplary embodiment, the description will be omitted and the processing different from the processing in the first exemplary embodiment will be described.

Figure 13:
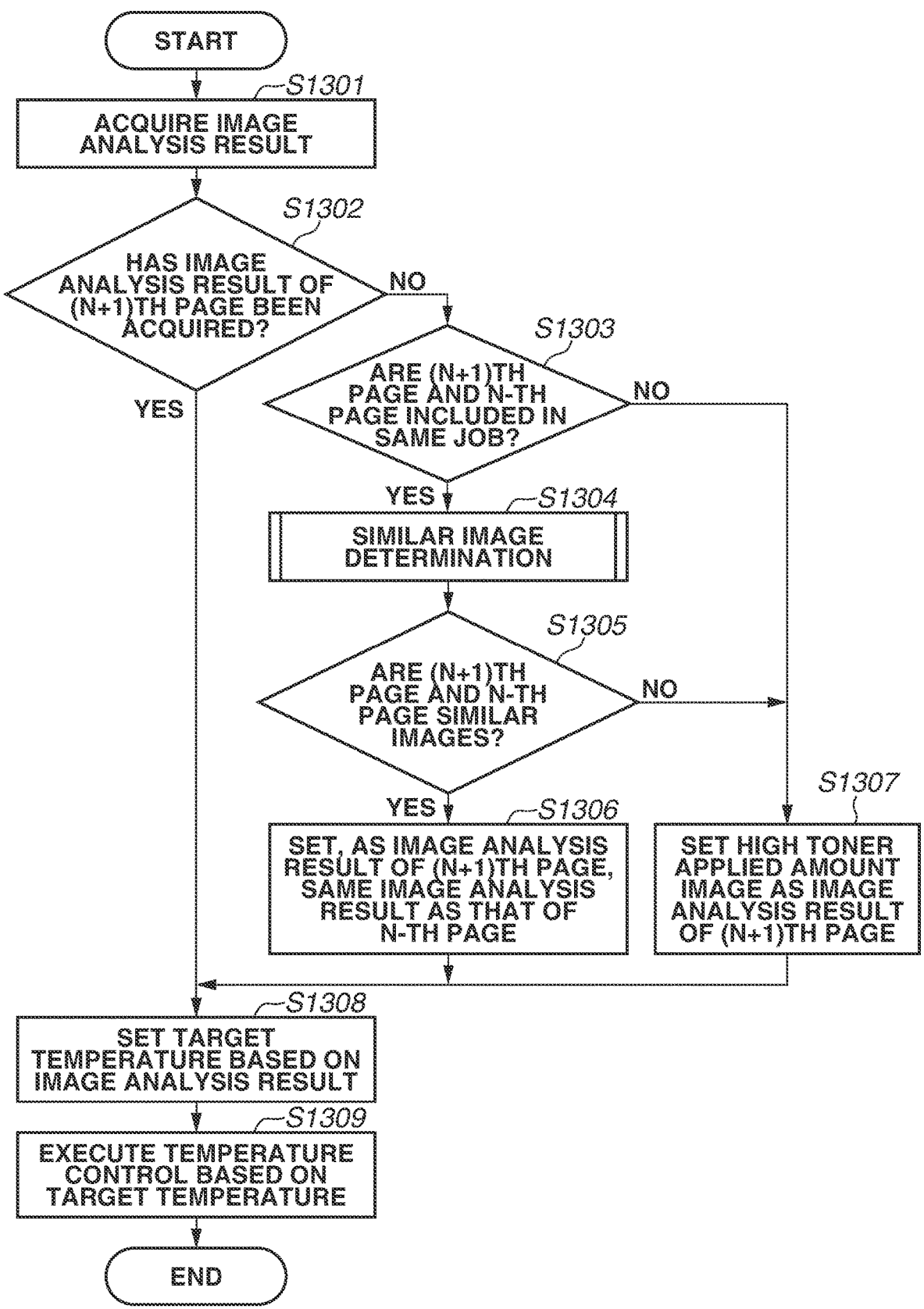
FIG. 13 is a flowchart illustrating a processing flow of fixing temperature control according to a second exemplary embodiment.

Hereinafter, the processing of fixing temperature control according to the present exemplary embodiment will be described in detail with reference to FIG. 13. A program for executing the flowchart is stored in any device of the ROM 105, the RAM 104, and the HDD 106, and is executed by the CPU 103.

Because steps S1301, S1302, and S1304 to S1309 are similar to steps S901, S902, and S903 to S907 illustrated in FIG. 9, the description will be omitted.

In step S1303, the CPU 103 determines whether images on a plurality of pages included in image data are similar images, based on whether the plurality of pages is included in the same printing job. More specifically, the CPU 103 determines whether the (N+1)th page and the N-th page are included in the same printing job. Whether the (N+1)th page and the N-th page are included in the same printing job can be determined based on whether job identifiers (job IDs) described in the headers of printing jobs including the target pages are identical, for example. If the (N+1)th page and the N-th page are included in the same printing job (YES in step S1303), the processing proceeds to step S1304. If the (N+1)th page and the N-th page are not included in the same printing job (NO in step S1303), the processing proceeds to step S1307. Pages included in the same job often include a common background image used as a template, and are often different in content arranged on the background. Nevertheless, if printing jobs are different, different templates are sometimes used between the printing jobs. Thus, in the continuous printing of different printing jobs, correlation between the N-th page and the (N+1)th page is sometimes low, and the (N+1)th page is set as a high toner applied amount image for avoiding a fixing failure.

As described above, according to the present exemplary embodiment, even in a case where a result of image analysis processing cannot be acquired, a fixing property is guaranteed at a switch timing of a printing job. In addition, it becomes possible to provide an image forming apparatus that can achieve power saving by appropriately performing temperature control during the execution of the same printing job.

In the first exemplary embodiment, the description has been given of a method of performing temperature control by setting an image analysis result of the (N+1)th page by determining whether an image on the N-th page and an image on the (N+1)th page are similar images, in a case where an image analysis result of the (N+1)th page cannot be acquired.

Nevertheless, depending on a printing speed of a printer, fixing temperature control is sometimes performed by acquiring an image analysis result of a further subsequent page (e.g., N+2).

A third exemplary embodiment will be described. In the third exemplary embodiment, fixing temperature control is performed based on information regarding image analysis results and video count values up to an (N+2)th page.

Figure 14B:
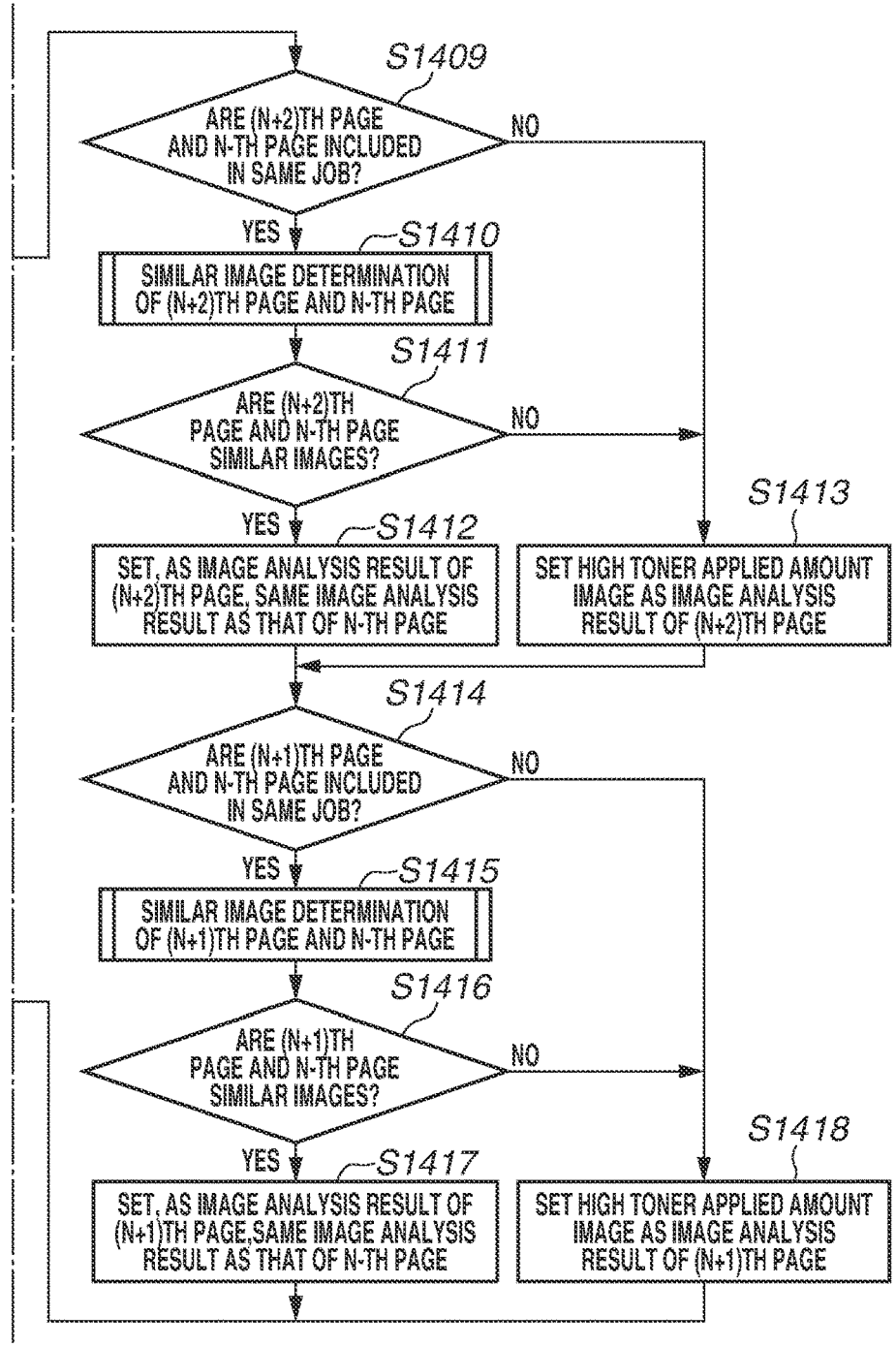

FIG. 14 is a flowchart illustrating fixing temperature control according to the present exemplary embodiment.

A program for executing the flowchart is stored in any device of the ROM 105, the RAM 104, and the HDD 106, and is executed by the CPU 103 before fixing of the N-th page.

Because processing in step S1401 is similar to the processing in step S901 illustrated in FIG. 9, the description will be omitted.

In step S1402, the CPU 103 determines whether an image analysis result of the (N+2)th page has been acquired. If an image analysis result of the (N+2)th page has been acquired (YES in step S1402), the processing proceeds to step S1419. If an image analysis result of the (N+2)th page has not been acquired (NO in step S1402), the processing proceeds to step S1403.

In step S1403, the CPU 103 determines whether an image analysis result of the (N+1)th page has been acquired. If an image analysis result of the (N+1)th page has been acquired (YES in step S1403), the processing proceeds to step S1404. If an image analysis result of the (N+1)th page has not been acquired (NO in step S1403), the processing proceeds to step S1409.

In step S1404, the CPU 103 determines whether the (N+2)th page and the (N+1)th page are included in the same job. If it is determined that the (N+2)th page and the (N+1)th page are included in the same job (YES in step S1404), the processing proceeds to step S1405. If it is determined that the (N+2)th page and the (N+1)th page are not included in the same job (NO in step S1404), the processing proceeds to step S1408.

In the present exemplary embodiment, in a case where image analysis results of the N-th page and the (N+1)th page have been acquired, as same job determination of the (N+2)th page, similar image determination is performed not with the N-th page but with the (N+1)th page. For explaining the reason, the description will be given of an example case where, if a printing job is switched between the N-th page and the (N+1)th page, same job determination of the (N+2)th page and the N-th page is performed. In this case, although an image analysis result of the (N+1)th page originally indicates a low toner applied amount image, the (N+2)th page might be determined as a switch point of a printing job and set to be a high toner applied amount image. The similar image determination is therefore performed with the (N+1)th page for preventing such a situation.

In step S1405, the CPU 103 performs similar image determination of the (N+2)th page and the (N+1)th page.

In step S1406, the CPU 103 determines whether the image on the (N+2)th page and the image on the (N+1)th page have been determined to be similar images in step S1404. If the images have been determined to be similar images (YES in step S1406), the processing proceeds to step S1407. If the images have been determined to be dissimilar images (NO in step S1406), the processing proceeds to step S1408.

In step S1407, the CPU 103 sets, as an image analysis result of the (N+2)th page, the same image analysis result as that of the (N+1)th page.

In step S1408, the CPU 103 sets, as an image analysis result of the (N+2)th page, an image analysis result indicating a high toner applied amount image.

In step S1409 shifting from step S1403, the CPU 103 determines whether the (N+2)th page and the N-th page are included in the same job. If it is determined that the (N+2)th page and the N-th page are included in the same job (YES in step S1409), the processing proceeds to step S1410. If it is determined that the (N+2)th page and the N-th page are not included in the same job (NO in step S1409), the processing proceeds to step S1413.

In step S1410, the CPU 103 performs similar image determination of the (N+2)th page and the N-th page.

In step S1411, the CPU 103 determines whether the image on the (N+2)th page and the image on the N-th page have been determined to be similar images in step S1410. If the images have been determined to be similar images (YES in step S1411), the processing proceeds to step S1412. If the images have been determined to be dissimilar images (NO in step S1411), the processing proceeds to step S1413.

In step S1412, the CPU 103 sets, as an image analysis result of the (N+2)th page, the same image analysis result as that of the N-th page.

In step S1413, the CPU 103 sets, as an image analysis result of the (N+2)th page, an image analysis result indicating a high toner applied amount image.

In step S1414, the CPU 103 determines whether the (N+1)th page and the N-th page are included in the same job. If it is determined that the (N+1)th page and the N-th page are included in the same job (YES in step S1414), the processing proceeds to step S1415. If it is determined that the (N+1)th page and the N-th page are not included in the same job (NO in step S1414), the processing proceeds to step S1418.

In step S1415, the CPU 103 performs similar image determination of the (N+1)th page and the N-th page.

In step S1416, the CPU 103 determines whether the image on the (N+1)th page and the image on the N-th page have been determined to be similar images in step S1415. If the images have been determined to be similar images (YES in step S1416), the processing proceeds to step S1417. If the images have been determined to be dissimilar images (NO in step S1416), the processing proceeds to step S1418.

In step S1417, the CPU 103 sets, as an image analysis result of the (N+1)th page, the same image analysis result as that of the N-th page.

In step S1418, the CPU 103 sets, as an image analysis result of the (N+1)th page, an image analysis result indicating a high toner applied amount image.

Processing in steps S1419 and S1420 is similar to the processing in steps S907 and S908 illustrated in FIG. 9. For example, if an image analysis result of the (N+2)th page has been acquired (YES in step S1402), a target temperature is set based on an image processing result of each page. More specifically, if an analysis result of image data of the (N+1)th page and an analysis result of image data of the (N+2)th page have been acquired, the CPU 103 performs the following processing. The CPU 103 determines a fixing temperature for printing the image data of the N-th page, at least based on an analysis result of image data of the N-th page, the analysis result of image data of the (N+1)th page, and the analysis result of image data of the (N+2)th page.

Alternatively, for example, in a case where an image analysis result of the (N+2)th page has not been acquired (NO in step S1402) and an image analysis result of the (N+1)th page has been acquired (YES in step S1403), that is to say, if analysis results of image data of the N-th page and the (N+1)th page have been acquired and an analysis result of image data of the (N+2)th page has not been acquired, the CPU 103 performs the following processing. The CPU 103 determines a fixing temperature of the N-th page at least based on a result of determination (step S1406) as to whether the image on the (N+1)th page and the image on the (N+2)th page are similar, the analysis result of image data of the N-th page, and the analysis result of image data of the (N+1)th page.

Alternatively, for example, if an image analysis result of the (N+1)th page has not been acquired (NO in step S1403), that is to say, if analysis results of image data of the (N+1)th page and the (N+2)th page have not been acquired, the CPU 103 performs the following processing. The CPU 103 determines a fixing temperature of the N-th page at least based on a result of determination (step S1411) as to whether the image on the N-th page and the image on the (N+2)th page are similar, and a result of determination as to whether the image on the N-th page and the image on the (N+2)th page are similar. In this case, in step S1419, a fixing temperature of the N-th page is determined considering the analysis result of image data of the N-th page as well.

As described above, according to the present exemplary embodiment, even in a case where a result of image analysis processing cannot be acquired, it is possible to appropriately determine switching of a printing job by determining whether the target page is included in the same job as the closest image analysis result. With this configuration, it becomes possible to provide an image forming apparatus that can achieve power saving by appropriately executing temperature control.

In the present exemplary embodiment, the description has been given of an example in which whether a plurality of pages is included in the same job is determined in steps S1404, S1409, and S1414, but these determination processes may be omitted. When these determination processes are omitted, effects similar to the present exemplary embodiment can be provided by always performing processing to be performed in a case where it is determined that a plurality of pages is included in the same job (YES in each determination step).

According to the above-described exemplary embodiments, it is possible to appropriately perform temperature control and achieve power saving even in a case where a result of image analysis processing cannot be acquired.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2019-007941, filed Jan. 21, 2019, which is hereby incorporated by reference herein in its entirety.

What is claimed is:

1. An image processing apparatus that controls a fixing temperature for fixing developer onto a recording medium, the image processing apparatus comprising:
at least one controller, having at least one processor which executes instructions stored in at least one memory and/or at least one circuitry, configured to:
perform a first analysis of image data;
halftone the image data;
perform a second analysis of the halftoned image data; and
determine a fixing temperature for printing the halftoned image data of an N-th page based on an analysis result by the second analysis of the image data of the N-th page and an analysis result by the second analysis of the image data of an (N+1)th page,
wherein in a case where the analysis result by the second analysis of the image data of the (N+1)th page has not yet been obtained, the controller is configured to determine the fixing temperature for printing the halftoned image data of the N-th page based on an analysis result by the first analysis of the image data of the (N+1)th page and the analysis result by the second analysis of the image data of the N-th page.

2. A control method for causing an image processing apparatus that controls a fixing temperature for fixing developer onto a recording medium, the method comprising:
performing a first analysis of image data;
halftoning the image data;
performing a second analysis of the halftoned image data;
determining a fixing temperature for printing the halftoned image data of an N-th page based on an analysis result by the second analysis of the image data of the N-th page and an analysis result by the second analysis of the image data of an (N+1)th page, and,
determining, in a case where the analysis result by the second analysis of the image data of the (N+1)th page has not yet been obtained, the fixing temperature for printing the halftoned image data of the N-th page based on an analysis result by the first analysis of the image data of the (N+1)th page and the analysis result by the second analysis of the image data of the N-th page.

3. A non-transitory computer readable storage medium storing a program for causing a computer included in an image processing apparatus that controls a fixing temperature for fixing developer onto a recording medium, to execute:
performing a first analysis of image data;
halftoning the image data;
performing a second analysis of the image data;
determining a fixing temperature for printing the halftoned image data of an N-th page based on an analysis result by the second analysis of the image data of the N-th page and and analysis result by the second analysis of the image data of an (N+1)th page, and,
determining, in a case where the analysis result by the second analysis of the image data of the (N+1)th page has not yet been obtained, the fixing temperature for printing the halftoned image data of the N-th page based on an analysis result by the first analysis of the image data of the (N+1)th page and the analysis result by the second analysis of the image data of the N-th page.

4. The image forming apparatus according to claim 1, wherein the first analysis is an analysis for deriving a video count value of the image data.

5. The image forming apparatus according to claim 4, wherein the video count value is a prediction value for an amount of recording material to be used for printing entire part of the halftoned image data.

6. The image forming apparatus according to claim 1, wherein the second analysis is an analysis for deriving a maximum amount among an amount of recording material to be used for printing each part of the halftoned image data.

7. The image forming apparatus according to claim 1, wherein the controller is configured to:
determine whether the analysis result by the first analysis of the image data of the (N+1)th page and an analysis result by the first analysis of the image data of the N-th page are similar to each other;
based on a determination that the analysis results by the first analysis of the N-th and (N+1)th pages are similar, determine the fixing temperature for printing the halftoned image data of the N-th page, assuming that the analysis result by the second analysis of the image data of the (N+1)th page is same as the analysis result by the second analysis of the image data of the N-th page.

8. The image forming apparatus according to claim 7, wherein the controller is configured to:
based on a determination that the analysis results by the first analysis of the N-th and (N+1)th pages are not similar, determine the fixing temperature for printing the halftoned image data of the N-th page, assuming that the analysis result by the second analysis of the image data of the (N+1)th page is a maximum value.

\* \* \* \* \*